US009474089B2

United States Patent
Wei

(10) Patent No.: US 9,474,089 B2
(45) Date of Patent: Oct. 18, 2016

(54) USER EQUIPMENT AND BASE STATION WITH CONFIGURABLE CARRIER

(71) Applicant: Acer Incorporated, New Taipei (TW)

(72) Inventor: Hung-Yu Wei, New Taipei (TW)

(73) Assignee: Acer Incorporated, New Taipei (TW)

( * ) Notice: Subject to any disclaimer, the term of this patent is extended or adjusted under 35 U.S.C. 154(b) by 97 days.

(21) Appl. No.: 14/277,813

(22) Filed: May 15, 2014

(65) Prior Publication Data

US 2015/0110011 A1    Apr. 23, 2015

Related U.S. Application Data

(60) Provisional application No. 61/894,138, filed on Oct. 22, 2013, provisional application No. 61/902,298, filed on Nov. 11, 2013, provisional application No. 61/922,102, filed on Dec. 31, 2013, provisional application No. 61/922,105, filed on Dec. 31, 2013.

(51) Int. Cl.
| | |
|---|---|
| *H04W 74/00* | (2009.01) |
| *H04L 5/00* | (2006.01) |
| *H04B 7/26* | (2006.01) |
| *H04W 72/04* | (2009.01) |

(52) U.S. Cl.
CPC ......... *H04W 74/006* (2013.01); *H04B 7/2656* (2013.01); *H04L 5/0098* (2013.01); *H04W 72/0446* (2013.01)

(58) Field of Classification Search
CPC .................................................. H04W 74/006
See application file for complete search history.

(56) References Cited

U.S. PATENT DOCUMENTS

| | | | |
|---|---|---|---|
| 2007/0133479 A1* | 6/2007 | Montojo | H04W 52/0216 370/335 |
| 2014/0003349 A1* | 1/2014 | Kang | H04L 5/0053 370/328 |
| 2014/0185539 A1* | 7/2014 | Seo | H04B 7/2656 370/329 |
| 2014/0219267 A1* | 8/2014 | Eyuboglu | H04W 56/001 370/350 |
| 2015/0250017 A1* | 9/2015 | Ingale | H04B 7/2615 370/280 |

* cited by examiner

*Primary Examiner* — Jason Mattis

(74) *Attorney, Agent, or Firm* — Jianq Chyun IP Office

(57) ABSTRACT

The present disclosure proposes a dynamic resource allocation mechanism for a user equipment and a base station having multiple connections. According to one of the exemplary embodiment, the present disclosure proposes a user equipment (UE) which includes at least but not limited to a transmitter and a receiver for transmitting and receiving data respectively and a processing circuit coupled to the transmitter and the receiver and is configured for establishing a first connection with a first base station by using the transmitter and the receiver, establishing a second connection with a second base station by using the transmitter and the receiver, receiving through the receiver a dynamic time division duplexing (TDD) subframe configuration from either the first base station and the second base station, wherein the dynamic TDD subframe configuration is not received from a system information block (SIB), and operating according to the dynamic TDD subframe configuration.

14 Claims, 30 Drawing Sheets

| UL-DL Configuration | Subframe number | | | | | | | | | | DL:UL ratio |
|---|---|---|---|---|---|---|---|---|---|---|---|
| | 0 | 1 | 2 | 3 | 4 | 5 | 6 | 7 | 8 | 9 | |
| 0 | D | S | U | U | U | D | S | U | U | U | 2:6 |
| 1 | D | S | U | U | D | D | S | U | U | D | 4:4 |
| 2 | D | S | U | D | D | D | S | U | D | D | 6:2 |
| 3 | D | S | U | U | U | D | D | D | D | D | 6:3 |
| 4 | D | S | U | U | D | D | D | D | D | D | 7:2 |
| 5 | D | S | U | D | D | D | D | D | D | D | 8:1 |
| 6 | D | S | U | U | U | D | S | U | U | D | 3:5 |

USER EQUIPMENT AND BASE STATION WITH CONFIGURABLE CARRIER

CROSS REFERENCE TO RELATED APPLICATION

This application claims the priority benefit of U.S. provisional application Ser. No. 61/922,102 filed on Dec. 31, 2013, 61/922,105 filed on Dec. 31, 2013, 61/902,298 filed on Nov. 11, 2013, and 61/894,138 filed on Oct. 22, 2013. The entirety of the above-mentioned patent applications are hereby incorporated by reference herein and made a part of specification.

TECHNICAL FIELD

The present disclosure relates to a user equipment and a base station operating with a configurable carrier.

BACKGROUND

A TDD system typically refers to a communication system in which uplink and downlink transmissions would share a single carrier frequency but be divided in the time domain across different subframes. In a typical Long Term Evolution (LTE) communication system, a radio frame would be divided into 10 subframes, and each subframe could be allocated for an uplink transmission, a downlink transmission, or a special subframe which is used as a guard period and/or as a time slot reserved for a pilot signal. Such allocation schemes for each individual subframes could be defined according to several possible configurations.

FIG. 1 is a diagram which illustrates TDD uplink-downlink frame configurations in a conventional LTE communication system with a D denoting a downlink subframe, a U denoting a uplink subframe, or a S denoting a special subframe for each of the subframes numbered from 0 to 9. For example, according to the diagram in FIG. 1, if the uplink-downlink frame configuration zero is selected, then subframe numbers 0 and 5 would be allocated for downlink transmissions, subframe numbers 1 and 6 would be allocated as special subframes, and the rest of the subframes, subframe numbers 2~4 and 7~9, would be allocated for uplink transmissions. The uplink to downlink ratio for configuration 0 would be 2 versus 6.

In order to effectively increase data rates in LTE/LTE-A and future generations of broadband wireless communication systems, Carrier Aggregation (CA) could be an effective way to increase the data rates. Carrier aggregation could be used in both a Frequency Domain Duplex system (FDD) and a Time Domain Duplex system (TDD) to combine frequency bandwidths in order to increase the capacity of a communication system. For the current Long Term Evolution Advanced (LTE-A) system as an example, each aggregated carrier is called a component carrier and has a bandwidth of 1.4, 3, 5, 10, 15 or 20 MHz. Since a maximum of five component carriers could be aggregated under LTE-A, a total of 100 MHz of maximum bandwidths could be provided under the carrier aggregation scheme. Each component carrier could also have different bandwidths. Two component carriers could be frequency contiguous or adjacent to each other, but any two component carriers not frequency continuous to each other may also be aggregated. Also for each component carrier, a time division duplex (TDD) scheme in which uplink and downlink transmissions would share a single carrier frequency but be divided in the time domain across different subframes could be imposed.

When carrier aggregation is utilized by a wireless communication system, each component carrier could be considered to serve an individual cell. Each cell may have a different coverage range or may overlap with another cell partially or completely. When carriers are aggregated, each carrier is referred to as a component carrier. A component carrier could be categorized into one of two categories—a primary component carrier and a secondary component carrier. The primary component carrier would be the main carrier within a coverage area, and thus there would be a primary downlink carrier and an associated uplink primary component carrier. Additionally, there could also be one or more secondary component carriers. The primary component carrier would serve the primary serving cell (PCC) and could provide most or all of the signaling transmissions for both uplinks and downlinks. Each secondary component carrier would serve a secondary serving cell (SSC) for downlinks and possibly uplinks and would mostly be used carry user data.

The use of primary component carriers and secondary component carriers in a carrier aggregation operation could be seen in heterogeneous wireless network deployment scenarios in which some cells with greater transmission ranges such as macrocells could provide the primary component carriers while other cells with local coverage such as small cells or femtocells would provide the secondary component carriers in order to increase the data transmitting capacities. In a dual-connectivity case, a user device might connect to both a macrocell base station and a small cell base station to enjoy both the network coverage and higher capacity. In one example, a dual-connecting UE might be served by a coverage carrier by a macrocell base station and a capacity carrier by small cell base station.

However, the configuration of downlink subframes and uplink subframes have conventionally been quite static during system operations since a network operator would select a configuration based on the long-term average of uplink and downlink traffic ratios. It has been observed recently that wireless data traffic has becoming bursty in nature, and variations of downlink-uplink traffic ratios could be at times very fast changing. Consequently, a dynamic TDD system in which uplink and downlink subframe ratios could be adaptively configured according to instantaneous traffic conditions has been considered in order to improve the performance of a communication system as "Further Enhancements to LTE TDD for DL-UL Interference Management and Traffic Adaptation" has been considered to be an important working item for 3GPP Release 12.

Furthermore, the traditional SIB update mechanism is not yet satisfactory for the purpose of dynamically updating a system parameter such as the uplink-downlink frame configuration in a real time basis. The system information could be broadcasted, for example, every 320 milliseconds. The broadcast periodicity is kept relatively short in order to accommodate UEs which may frequently move in and out of the broadcast range without having to wait for a long period to acquire system information.

One problem is that a base station cannot make alterations to system information during every broadcast as it would mean that the UEs have to check whether the system information is altered more frequently than necessary. Instead, a base station may only modify system information at the front boundary of a modification period (MP), which may occur, for example, every 40 seconds. As the result of the long modification period, it would be rather difficult for a base station to instantaneously change the uplink-downlink frame configuration in case the traffic becomes heavy all in a sudden.

As the wireless communication traffic may become relatively non-existent, energy savings and interference reductions could be achieved when communications are turned off in certain subframes. The potentially bursty nature of wireless communication traffic may nevertheless require a system to dynamically activate and set dormant certain downlink or uplink subframes. Therefore, a mechanism would be needed to provide a solution for configurations for dynamic activation of radio resources. In order to achieve the goal of dynamically adjusting subframe configurations, signaling mechanism would be essential as signaling mechanisms would communicated among network control nodes, base stations, and UEs. Without a proper signaling mechanism for subframe configurations, a base station would either be overloaded under heavy data traffic or lightly loaded when continuously receiving empty subframes. A user equipment may also benefit by saving computational power and energy consumptions under a properly designed signaling mechanism for subframe configurations.

Therefore, the present disclosure proposes a design which provides flexibilities in a network system operation to dynamically meet various traffic demands and interference conditions.

SUMMARY OF THE DISCLOSURE

Accordingly, the present disclosure proposes a user equipment and a base station operating with a configurable carrier.

More specifically, the present disclosure proposes a user equipment (UE) which includes at least but not limited to a transmitter and a receiver for transmitting and receiving wireless data respectively and a processing circuit coupled to the transmitter and the receiver and is configured for receiving through the receiver a first configuration message which includes an uplink configuration for a first subframe of a first radio frame and a downlink configuration for a second subframe of the first radio frame. It should be noted that the first subframe and the second subframe of the first radio frame are both without any uplink configuration and without any downlink configuration before receiving the first configuration message to be configured for uplink or downlink. Instead of having subframes configured for uplink or downlink according to a pre-set configuration according to a configuration table such as FIG. 1, the present disclosure first assumes empty subframes within a radio frame, and then some or all of the individual subframes would be activated for either uplink or downlink.

After receiving the first configuration message, the UE would execute configuring the first subframe of the first radio frame with the uplink configuration and by configuring the second subframe of the first radio frame with the downlink configuration after receiving through the receiver the first configuration message. After the subframes have been configured, the UE would execute transmitting through the transmitter an uplink data in the first subframe of the first radio frame, and a downlink data in the second subframe of the first radio frame after configuring the first radio frame.

According to an exemplary embodiment, before the aforementioned receiver receives the first configuration message, the first radio frame would further contain a third subframe which has already been configured for either uplink or downlink. This would mean that the activation of the first subframe and the second subframe of the first radio frame would be on top of another subframe which has already been configured for uplink or downlink or on top of another anchoring subframe which is configured for uplink or downlink by default and the configuration repeats according to a predetermined period or pattern.

According to an exemplary embodiment, the configurations of the abovementioned processing circuit for transmitting through the transmitter the first radio frame would further include transmitting a fourth subframe in the first radio frame, wherein the fourth subframe would not have been activated for downlink or uplink. This would mean that the transmitted first radio frame may include empty subframes.

According to an exemplary embodiment, the configurations of the abovementioned processing circuit would further include receiving through the receiver a second configuration message to set dormant the first subframe of the radio frame or the second subframe of the first radio frame. That would mean that a previously configured subframe could be set dormant by another subsequent configuration message. A previously dormant subframe could also be activated by another subsequent configuration message.

According to an exemplary embodiment, the configurations of the abovementioned processing circuit would further include transmitting through the transmitter a second radio frame in which all subframes have the same uplink configuration or downlink configuration as the first radio frame. This would mean that the subframe pattern of the second radio frame could be a repeat of the first radio frame. The repetition could be an once time activation or on a semi-persistent scheduling basis or for a specific duration.

According to an exemplary embodiment, the configurations of the processing circuit would further include transmitting through the transmitter a third radio frame in which all subframes are without any uplink configuration and without any downlink configuration. This would mean that right after the first radio frame has been transmitted, the very next radio frame would contain all empty or all dormant subframes.

According to an exemplary embodiment, wherein in response to the processing circuit configuring the first subframe of the first radio frame for uplink and configuring the second subframe of the first radio frame for downlink, the first subframe and the second subframe would be dormant and no longer activate after a specific period.

According to an exemplary embodiment, the configurations of the processing circuit would further include receiving through the receiver the first configuration message by decoding a physical downlink control channel (PDCCH). This would mean that the first configuration message would be encoded in the PDCCH which is carried by a frequency that is different from the frequency used to transmit user data.

According to an exemplary embodiment, the configurations of the processing circuit would further include decoding from the PDCCH a new Radio Network Temporary Identifier (RNTI) from which the UE decodes the first configuration message. This would mean that the first configuration message could be obtained by decoding a new RNTI from the PDCCH.

According to an exemplary embodiment, the configurations of the processing circuit would include receiving through the receiver a system information block (SIB) from which the first configuration message is obtained by the UE.

The present disclosure also proposes a base station which includes at least but not limited to a transmitter and a receiver for transmitting and receiving wireless data respectively and a processing circuit coupled to the transmitter and the receiver and is configured for configuring a first subframe of a first radio frame with an uplink configuration and configuring a second subframe of the first radio frame with an downlink configuration. The first subframe and the second subframe of the first radio frame are both without any uplink configuration and without any downlink configuration before the first radio frame is configured.

After the first radio frame has been configured by the base station, the base station would execute transmitting through the transmitter a first configuration message comprising the uplink configuration for the first subframe of the first radio frame and the downlink configuration for the second subframe of the first radio frame. The first configuration message would configure the first radio frame in a user device. After transmitting the first configuration message, the base station would execute receiving through the transmitter an uplink data in the first subframe of the first radio frame, and transmitting an downlink data in the second subframe of the first radio frame.

According to an exemplary embodiment, before the transmitter transmits the first configuration message, the first radio frame would contain a third subframe which has already been configured for either uplink or downlink.

According to an exemplary embodiment, the configurations of the processing circuit for transmitting through the transmitter the first radio frame would further include a fourth subframe in the first radio frame which has not been activated for downlink or uplink.

According to an exemplary embodiment, the configurations of the processing circuit would further include receiving through the receiver a second configuration message to set dormant the first subframe of the radio frame or the second subframe of the first radio frame.

According to an exemplary embodiment, the configurations the processing circuit would further include transmitting through the transmitter a second radio frame in which all subframes have the same uplink configuration or downlink configuration as the first radio frame.

According to an exemplary embodiment, the configurations of the processing circuit would further include transmitting through the transmitter a third radio frame in which all subframes are without any uplink configuration and without any downlink configuration.

According to an exemplary embodiment, in response to the processing circuit configuring the first subframe of the first radio frame for uplink and configuring the second subframe of the first radio frame for downlink, the first subframe and the second subframe would be claimant after a specific period.

According to an exemplary embodiment, the configurations of the processing circuit would further include transmitting through the transmitter the first configuration message encoded a physical downlink control channel (PDCCH) which transmitted over the first frequency.

According to an exemplary embodiment, the configurations of the processing circuit would further include encoding the first configuration message using a new Radio Network Temporary Identifier (RNTI) which is encoded within the PDCCH.

According to an exemplary embodiment, the configurations of the processing circuit would further include transmitting through the transmitter a system information block (SIB) from which the capability of configurable carriers is announced by the base station.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figures 1, 2:
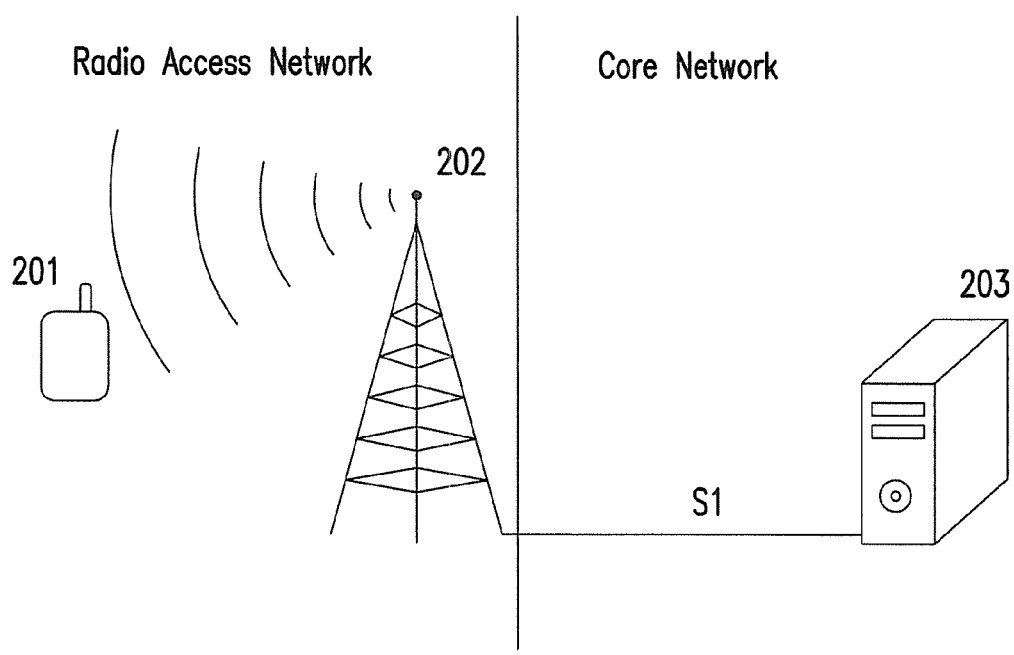
FIG. 1 is a diagram which illustrates a conventional LTE TDD uplink-downlink frame configurations
FIG. 2 illustrates a communication system in accordance with an exemplary embodiment of the present disclosure.

Reference will now be made in detail to the present exemplary embodiments of the disclosure, examples of which are illustrated in the accompanying drawings. Wherever possible, the same reference numbers are used in the drawings and the description to refer to the same or like parts.

It has been observed that energy savings and interference reductions might be achieved when certain subframes in a radio frame has been turned off, and also subframes could be dynamically turned on when wireless communication traffic might exhibit a rather bursty pattern. One of the aims in the proposed design would be to provide a solution to for dynamic subframe configuration of radio resources as well as a signaling solution to achieve the dynamic configuration. In this disclosure, the proposed signaling mechanisms would be applied between base stations and UEs. In addition, dynamic activation information could be exchanged between base stations and network controllers through backhaul links.

Under the circumstance when few devices are attached to a base station or when the base station experiences lightly loaded network traffic, the base station may have other choices besides continuously receiving empty subframes. In the case when a subframe has been configured for upload or download, power would be consumed even when the subframe receives empty data since at least some signalings, such as a reference signal, would be required to make the activated subframe usable. However, both a base station and UE could save energy by actually deactivating subframes and then dynamically activating subframes when needed. The proposed design would provide flexibility in network system operation and configuration to meet various traffic demands and interference conditions.

FIG. 2 illustrates a communication system in accordance with an exemplary embodiment of the present disclosure. For exemplary purposes, the communication system 200 could include at least but not limited to a UE 201 served by a base station 202 which is connected to a network control node 203 in accordance with a communication standard. It should be noted that FIG. 2 only shows a quantity of one for each network element for the reason of brevity as in actual practice the proposed communication system would actually involve a rather large quantities of UEs, eNBs, and network control nodes.

Figure 3:
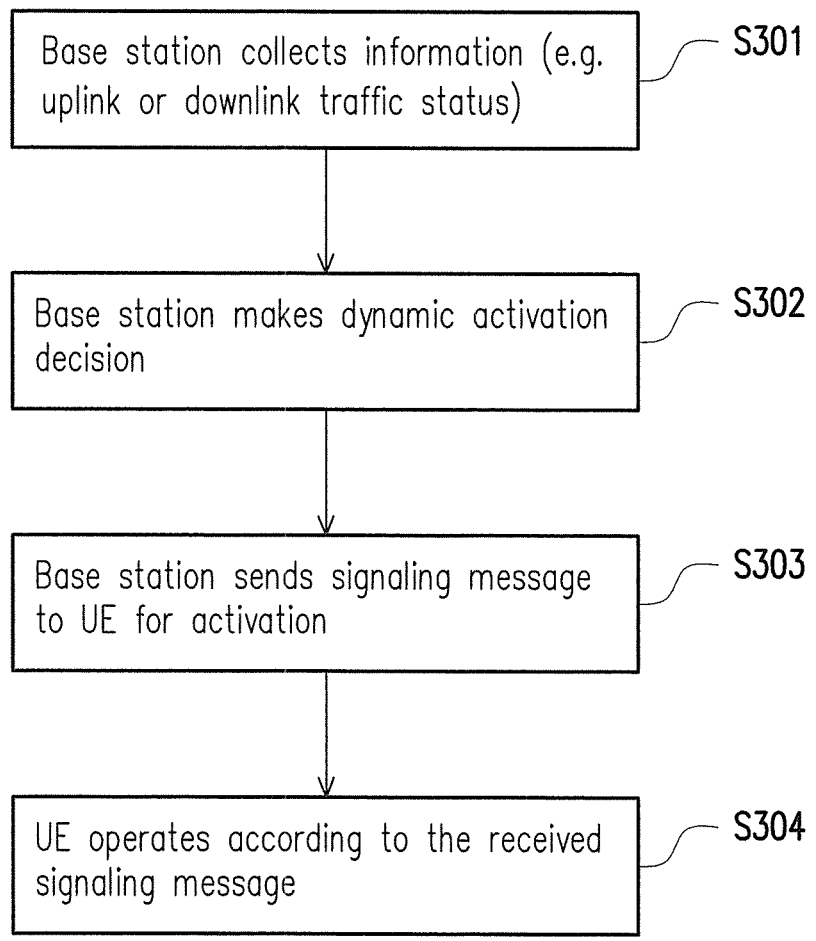
FIG. 3 illustrates an overview of the proposed dynamic subframe activation in accordance with an exemplary embodiment of the present disclosure.

FIG. 3 illustrates an overview of the proposed dynamic subframe activation in accordance with an exemplary embodiment of the present disclosure. In step S301, a base station may collect information related to the volume of network traffic such as uplink or downlink traffic statuses from UE connections or attachments to the base station to determine the current volume of the network traffic experienced by the base station. Dynamic activation mechanism might be triggered by traffic demand. For example, if a large amount of uplink traffic is expected, a UE might request a base station to activate an empty subframe as an active uplink subframe. For another example, if the queued packets in a downlink buffer are high, the base station might activate an empty subframe as an active downlink subframe.

In step S302, based on the information related to the volume of the network traffic, the base station may make dynamic activation decisions. The decisions may include which radio frame communicating to what UE to activate or set dormant and also which subframe(s) of the radio frame to configure or de-configuration, and the duration of the activated status of the radio frame.

The activation or configuration of a radio frame could be a one-time activation/configuration event. This means that the very next radio frame would be dormant. Also any configuration of subframes of a radio frame could be applicable for only one radio frame as the very next radio frame would need to be separately configured. The configuration of a radio frame and its subframe could also take on a semi-persistent scheduling (SPS) characteristic. This means that the subframe(s) configuration of radio frames could keep repeating according to a configured pattern until the base station or the network decides to make a subsequent change which could be triggered by a change in the network traffic status experienced by the base station or by the network. Also the SPS could also be applied to subframe(s). This would mean that when a configuration signaling message is sent by a base station or by a network control node to configure the dynamic activation of a subframe, the configured subframe would be activated and configured the same way repeatedly for a period of time until the base station or the network decides to reconfigure the subframe.

Also, another configuration signaling message might be sent from a base station or a network to set dormant the subframe that is already active in a semi-persistent manner. The deactivation could be an one-time event and apply only to one radio frame or the deactivation could be semi-persistent until another configuration signaling message is received to activate and the subframe.

According to one of the exemplary embodiments, the activation and the configuration of a subframe could occur simultaneously via the same configuration signaling message. Configuration of a subframe would mean that a base station has determined that a subframe is one of an uplink subframe, a downlink subframe, or a special subframe, and the determination would be communicated to one or more UEs. When the configuration of a subframe is completed, the base station could dynamically activate or deactive a subframe for uplink or downlink. Also when a UE receives the configuration of the subframe, the subframe would be activated for uplink or downlink. According to another one of the exemplary embodiment, the configuration and activation of a subframe are two separate events and would require a signaling message to configure a subframe and another configuration signaling message to activate the subframe.

A timer mechanism might be used for the counting (or setting/resetting) valid duration of an activation subframe. In one embodiment, a timer might be set to indicate the number of sequential radio frames to be active. For another embodiment, a timer could be set to indicate the duration between the last subframe with activities (e.g. traffic transmission) and the current subframe. Regardless whether the timer counts up or counts down, when the allocated time expires, the last subframe with activities would be dormant. In another embodiment, the last activity could be defined in terms of unit(s) of radio frame or unit(s) of subframe. For example, if the last activity is define in terms of two units of radio frames, then after two units of radio frames have been activated and configured, a timer would measure a specific time period after which the radio frames would be dormant upon expiration of the timer.

In step S303, a base station would transmit a configuration signaling message to a UE to activate and configure a future radio frame for uplink or downlink based on rule(s). More written descriptions about the configuration signaling message could be found in disclosures later. The rules could be used to define the activation of subframes for uplink or downlink, and there could also be different rules related to the activation of empty frame activation. The rules could be communicated from the network to the base station or from the base station to a user equipment; but the rules could also be predetermined and known by the base station or the user equipment. When the rules are received by a user equipment or a base station, the rules could be in place and activated when trying to setup or configure individual subframe(s) for uplink or downlink. Also the network and the base station could change the rules dynamically based on circumstances.

Some exemplary rules are as follows. An empty subframe could be activated as a downlink subframe or an uplink subframe without restriction. A specific empty subframe could be activated as a downlink subframe only, or a specific empty subframe on a repeating basis could be activated as a downlink subframe only. For instance, a rule could be communicated to a UE to indicate that the subframe zero of subsequent radio frames would be exclusively for downlink only. In the same way, an empty subframe could also be activated as a uplink subframe only. Also a set of subframes could be configured to follow only a specific pattern for one time only, for a specific duration, or for a semi-persistent basis. For example, an empty subframe sets may follow one of the TDD frame configuration patterns as shown in FIG. 1 or to follow a completely new pattern not found in FIG. 1.

In step S304, a UE upon receiving the configuration signaling message would operate according to the received configuration signaling message. The specific details related to step S304 would be explained by FIG. 4~FIG. 6B and their corresponding written descriptions.

Figure 4:
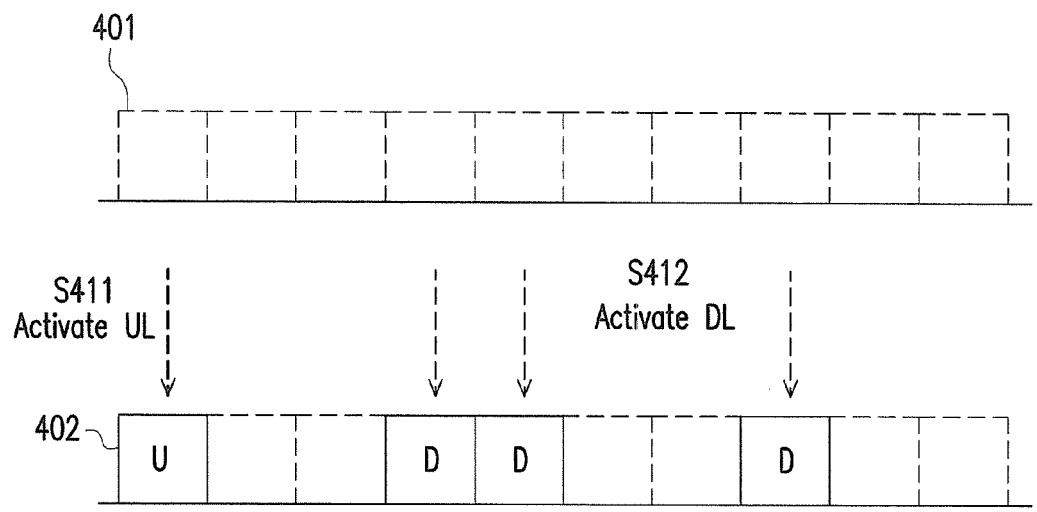
FIG. 4 illustrates a dynamic activation of subframes in a radio frame without an anchoring subframe in accordance with an exemplary embodiment of the present disclosure.

FIG. 4 illustrates a dynamic activation of subframes in a radio frame without an anchoring subframe in accordance with an exemplary embodiment of the present disclosure. Assuming that a base station determines to configure an empty radio frame 401 which would be used in the future to transport uplink or downlink data, a base station would transmit a configuration signaling message to a UE to activate specific subframes of a radio frame. The subframe 402 as shown in FIG. 4 would be the same radio frame 401 except that some of its subframes are activated and configured. Typically, in the LTE communication system for example, a radio frame would contain 10 subframes numbered from 0~9. Using the numbering reference as example, in step S411, subframe 0 would be activated and configured for uplink, and subframes 3, 4, and 7 would be activated and configured for downlink in step S412. Step S411 and step S412 could be substantially simultaneous or occur in any order. The other subframes, namely subframes 1, 2, 5, 6, 8, and 9 would not be activated but would actually stay dormant. The benefit of doing such would at least include that the reduction of signaling overhead.

One of the concepts of FIG. 4 is that any subframe of any radio frame could be dynamically configured and subsequently re-configured based on dynamic traffic conditions.

For example, if the traffic condition is light, a subsequent configuration message could be sent from a base station to a UE to set dormant one or more of the subframes 0, 3, 4, and 7 of the radio frame 402; whereas if the traffic condition is heavy, a subsequent configuration message could be sent from the base station to the UE to activate one or more of the subframes 1, 2, 5, 6, 8, and 9 of the radio frames 402. Also in another embodiment, additionally, each configuration of a subframe could also include additional information such as the dynamically allocated data capacity.

Figure 5:
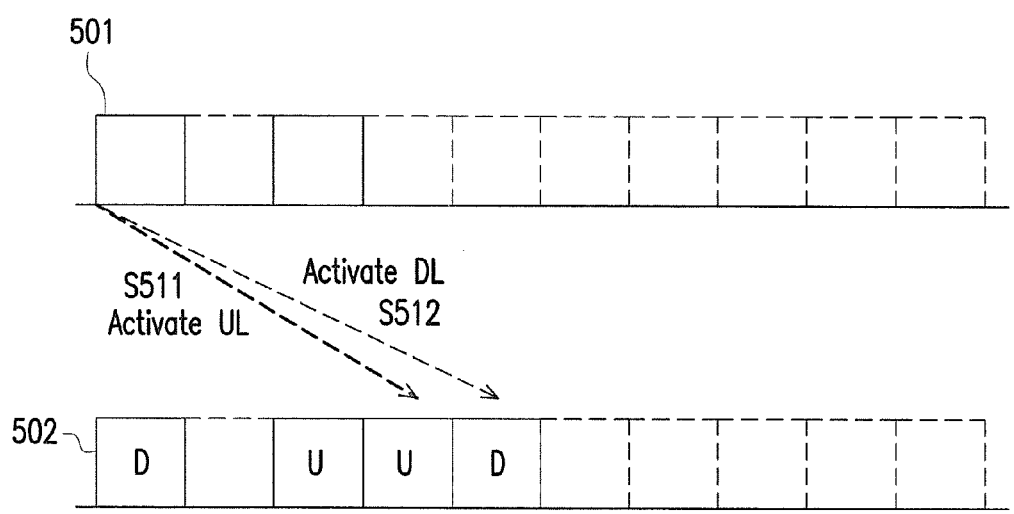
FIG. 5 illustrates dynamic activation of subframes in a radio frame with an anchoring subframe in accordance with an exemplary embodiment of the present disclosure.

FIG. 5 illustrates dynamic activation of subframes in a radio frame with at least one anchoring subframe in accordance with an exemplary embodiment of the present disclosure. An anchoring subframe refers to a subframe of a radio frame 501 having already been configured by default. This would mean that any subsequent radio frames immediately after the radio frame 501 would also contain the same configured subframe by default unless the anchoring subframe is individually reconfigured at a later time. The anchoring subframe would be repeating semi-persistently or for a specific duration in subsequent sequential radio frames. When anchoring one or more subframes are configured as anchor subframes, other subframes other than the anchoring subframes within a radio frame would stay dormant unless they are activated. Since the anchoring subframe would repeat, another configuration message could be used to activate non-anchoring subframes for one time only, for a specific duration, or semi-persistently. One of uses of this concept, for example, could be that a base station could use the anchoring subframes of repeating radio frames to accommodate the average traffic volume assumed by a base station. Other subsequently configuration messages could be transmitted to one or more UEs to dynamically configure other non-anchor subframes to account for the fluctuation of the data traffic experienced by the base station.

For a specific embodiment, FIG. 5 would be explained in detailed. Assuming that the radio frame 501 has been configured as a repeating radio frame with anchoring subframes in subframe 0 and 2. Assuming for example that the radio frame 502 would repeat in a SPS fashion, then subframe 0 would repeat as a repeating downlink subframe and subframe 2 would repeat as a repeating uplink subframe. Besides the anchoring subframes 0 and 2, a base station could transmit another configuration message to a UE to configure subframes 3 for uplink in step S511 and to configure subframe 4 for downlink in step S512. Steps S511 and S512 could occur simultaneously or in any order. Since, subframes 3 and 4 are not anchoring subframes, they would not necessarily repeat unless they are configured to repeat. Subframes 3 and 4 could each have a different configuration to be an one time only configuration, to repeat for a specific duration, or to repeat semi-persistently. Also a subsequent configuration message could set dormant any of the subframes 3 and 4 or even temporarily set dormant subframes 0 and 2 for one time only or for a specific duration assuming that the configuration of the anchoring subframe has not expired. In a similar fashion, another configuration message could yet be transmitted to activate any of the subframes 1, 5, 6, 7, 8, or 9 on top of the subframes 0, 2, 3 and 4 which have already been activated.

Figure 6A:
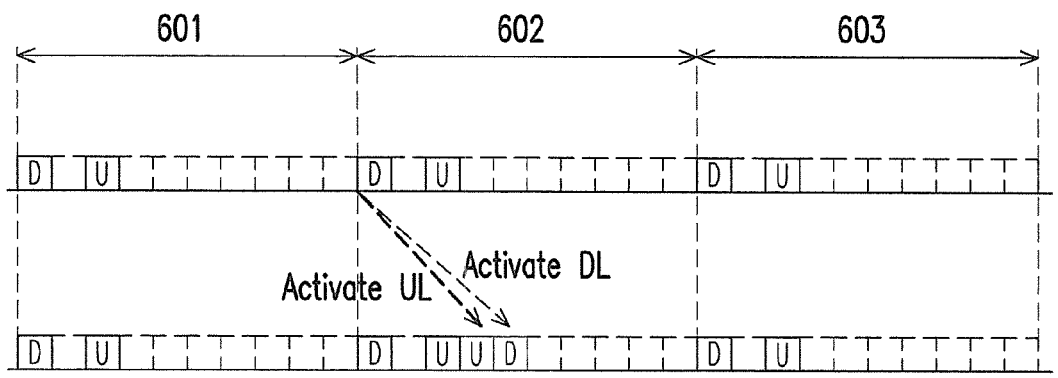
FIG. 6A illustrates a dynamic one time activation of subframes in a radio frame in accordance with an exemplary embodiment of the present disclosure.

FIG. 6A shows at least three radio frames 601 602 and 603 with repeating subframe configurations. In other words, the anchoring subframes 0 and 2 have been configured and would repeat in subsequent radio frames. In radio frame 602, in addition to subframe 0 and 2 which have been configured for downlink and uplink respectively, subframes 3 would be activated and configured for uplink and subframe 4 would be activated and configured for downlink. In the example of FIG. 6A, subframes 3 and 4 would be activated for one time only meaning that the subframe configuration for the following radio frame 603 would only contains the anchor subframes 0 and 2 as activated subframes. The other subframes in the radio frame 603 would stay dormant.

Figure 6B:
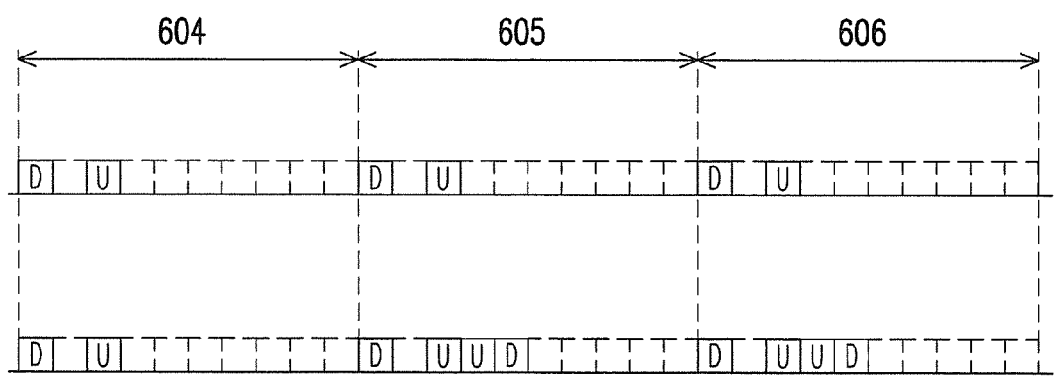
FIG. 6B illustrates a dynamic repeating activation of subframes in a radio frame in accordance with an exemplary embodiment of the present disclosure.

FIG. 6B would be another example showing radio frames 604 605 and 606 and would be very similar to FIG. 6A except that the subframe configuration of the radio 605 would be repeating rather than one time only. In detail, subframes 0 and 2 would be the anchor subframes for at least radio frames 604 605 and 606. In the radio frame 605, subframes 3 and 4 would be activated for downlink and uplink respectively, but the activation of subframes 3 and 4 along with the activation of anchor subframes would carry over to subsequent radio frames such as the radio frame 606 or radio frames after the radio frame 606.

Figure 7:
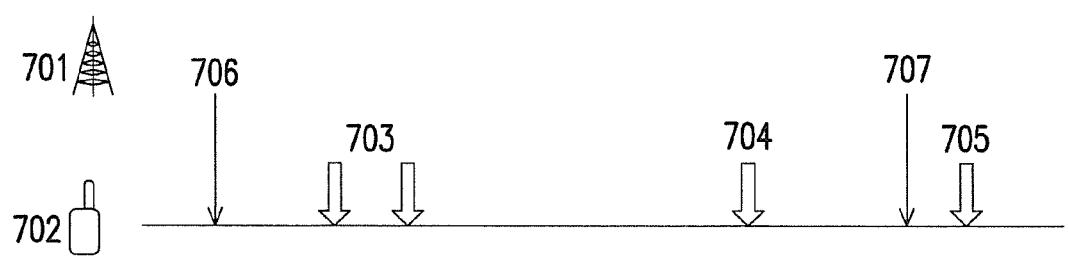
FIG. 7 illustrates signaling transmissions from a base station to a user equipment in accordance with an exemplary embodiment of the present disclosure.

FIG. 7 illustrates signaling transmissions from a base station 701 to at least one UE 702 in accordance with an exemplary embodiment of the present disclosure, and the following written description would describe signaling transmissions containing a configuration signaling message to configure subframes of a radio frame in further detail. In this exemplary scenario, various signalings 703~706 delivered to the UE 702 are shown on a time axis. Signaling 706 and 707 could be transmitted periodically in a regular interval to announce the capability of configurable carriers (i.e. subframes of a radio frame is individually configurable upon activation), and configuration signaling messages 703~705 would contain information to activate subframes of radio frames in order to be configured.

In more specific detail, signaling mechanism for announcing or advertising the capability of dynamic activation and configurable carrier operation in a cell could be implemented by a base station sending to UE(s) periodic transmission of system informations (SI), or the messages 706 and 707 could be any other periodic message. The particular announcement related to the configurable carrier could be located in a currently defined system information block (SIB) or in a new SIB which has not yet been defined by any communication standard. For instance, an indicator or flag could be defined in a SIB to indicate whether configurable carrier is supported within a cell. In an alternative embodiment, the indicator or flag may simply indicate that only repeating anchoring subframe configuration would be supported without dynamic subsequent activation to activate or set dormant individual subframes. In another embodiment, two indicators could be implemented in a SIB with one indicating the support for the activation of anchoring subframe(s) and the other indicating the support for dynamic activation to activate or set dormant individual subframes subsequent to the activation of the anchoring subframes. In another embodiment, a third indicator could be used to indicate whether the dynamic activation of subframes is currently being used, and a fourth indicator could be used to indicate whether the configuration of said dynamically activated subframe has been altered by the base station or by the network.

According to an exemplary embodiment, a pointer could be found in a SIB to point to the detailed rules or policies of the configuration of the configurable carrier and dynamic activation of subframes. Also, a mapping table could be implemented to indicate the uplink/downlink configuration pattern of a radio frame. The mapping table could either be stored in a SIB or pointed to by a pointer in a SIB. A base station or a user equipment can translate from the mapping table to discern the exact uplink/downlink subframe configuration of a radio frame. Also the activation rules and policies would be carried by a number of bits in a SIB or located in a location pointed to by a pointer in a SIB.

Similarly, a UE could report its capability of implementing such configuration carrier and dynamic activation/configuration operation to a base station so that the base station and/or the network would know that whether the UE is a legacy UE could actually possess the needed capability. For example, a UE may transmit a feedback message upon receiving the messages 706 707 or a configuration signaling message 0 such as 703 to indicate whether the UE would be capable of decoding the configuration signaling message that indicates an empty subframe is activated to be configured. Also such feedback message could be piggybacked upon another currently existing signaling message.

The configuration signaling messages 703, 704, and 705 could activate an empty subframe to be configured. Upon receiving such signaling message 703, 704, and 705 containing an activation configuration, a UE may come out of a power saving mode operation such as by switching from a low power mode to full power mode when a subframe is to be activated for configuration. However, a UE would not be active for uplink or downlink communication during the non-activated subframes.

In one exemplary embodiment, the signaling message to configure activation operation might be sent from a base station to UE could be implemented through a Physical downlink Control Channel (PDCCH) which could deliver the signaling message in a frequency that is in band or out of band from the frequency that delivers the user data.

In one exemplary embodiment, a new Radio Network Temporary Identifier (RNTI) could be used as a way to announce for configurable carrier from a base station to wireless devices. The new RNTI could be encoded within the PDCCH so that a base station might announce its activation operation by transmitting signaling with this new RNTI. Upon decoding this new RNTI, a UE may receive the signaling message that is related to the configurable carrier.

For another exemplary embodiment, multiple new RNTIs could be used for the operation related to the configurable carrier. For example, one new RNTI might be used to announce the base station dynamic activation configuration for an entire whole cell. In this way, the configuration would be applicable to all UEs within the cell. For another exemplary embodiment, UEs could be assigned into several groups. And each group might use one of the dynamic-activation RNTI so that a dynamic activation signaling message could be delivered to a group of UEs under a specific RNTI.

A base station (e.g. 202) could also interact with the network or with another base station, and such interaction could be implemented as follows. A base station in general may transmit a signaling message to a network controlling entity (e.g. 203) such as a MME or a SON server. The message could be for example a status updated related to the aforementioned configurable carrier or dynamic activation. The network controlling entity could also transmit a signaling message to a base station. For example, the signaling message could be used to carry a suggested activation mode policy. The signaling message could also carry an activation configuration command such that upon receiving the command, the base station may configure its activation operation accordingly.

A base station may also transmit signaling message to a nearby base station over an inter-base station interface such as a X2 interface in the case of LTE. The nearby base station to be communicated could be a base station serving a cell that might be within the interference range in order to notify the dynamic activation operation.

Upon receiving the signaling message from a nearby base station which is going to implement a dynamic activation, the nearby base station may implement a counter measure which may include adopting an interference mitigation strategy such as by taking increasing interference level from neighboring cell into consideration and adjusting its own transmission power level accordingly. The base station upon receiving the information related to the dynamic activation may also start performing interference measurements in order to implement a counter measure. Based on the interference measurement, the base station would also be able to adjust its radio resource allocation policy such as scheduling. For example, a base station may change its scheduling to avoid transmission in the radio resources that are indicated in dynamic activation in the neighboring cells for a reason such as that there might be increased interferences in those indicated radio blocks to be utilized in neighboring cells.

In an exemplary embodiment, a signaling message from one base station to another base station may include at least one of the followings such as a binary indicator of the on or off of the dynamic activation, an indicator indicating the level of activation state (e.g. high or low), a few bits to explicitly state the dynamic activation policy or frame configuration of configurable carrier, and a set of subframes which are configured for dynamic activation. Similarly the neighboring base station may send signaling message to the base station under the circumstance when the neighboring base station has just conducted a dynamic activation, to indicate the excessive interference condition such as to complain about the extra interference due to dynamic activation if the level of interference is beyond a tolerable level.

Figure 8:
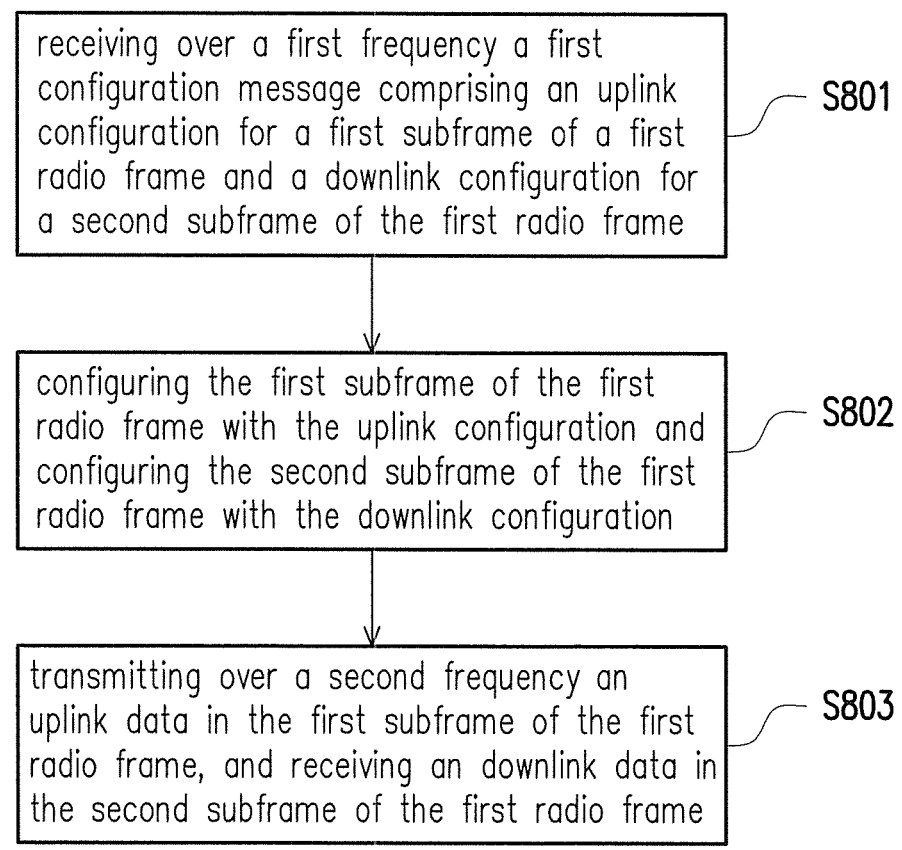
FIG. 8 illustrates the proposed dynamic subframe activation from the perspective of a user equipment in accordance with an exemplary embodiment of the present disclosure.

FIG. 8 summarizes the proposed dynamic subframe activation from the perspective of a user equipment in accordance with an exemplary embodiment of the present disclosure. In step S801, the UE would receive over a first frequency a first configuration message which includes at least but not limited to an uplink configuration for a first subframe of a first radio frame and a downlink configuration for a second subframe of the first radio frame. It should be noted that the first subframe and the second subframe of the first radio frame would both be dormant and thus without any uplink configuration and without any downlink configuration before receiving the first configuration message to configure the first and the second subframes. In step S802, the UE would activate and configure the first subframe of the first radio frame with the uplink configuration and would also activate and configure the second subframe of the first radio frame with the downlink configuration. In step S803, the UE would transmit over a second frequency an uplink data in the first subframe of the first radio frame and receive a downlink data in the second subframe of the first radio frame.

Figure 9:
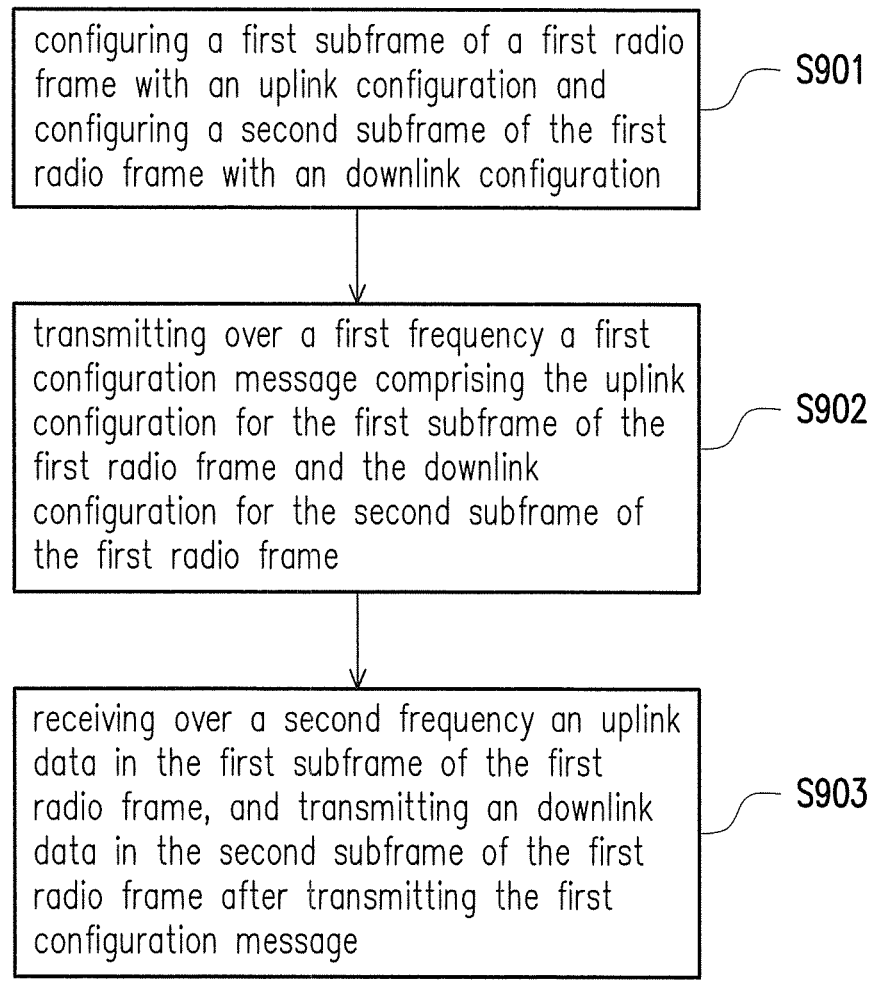
FIG. 9 illustrates the proposed dynamic subframe activation from the perspective of a base station in accordance with an exemplary embodiment of the present disclosure.

FIG. 9 summarizes the proposed dynamic subframe activation from the perspective of a base station in accordance with an exemplary embodiment of the present disclosure. In step S901, the base station activates and configures a first subframe of a first radio frame with an uplink configuration and activates and configures a second subframe of the first radio frame with a downlink configuration. It should be noted that the first subframe and the second subframe of the first radio frame are both dormant and without any uplink configuration and without any downlink configuration before configuring the first radio frame; In step S902, the base station would transmit over a first frequency a first configuration message which includes at least but not limited to the uplink configuration for the first subframe of the first radio frame and the downlink configuration for the second subframe of the first radio frame. In step S903, the base station would receive over a second frequency an uplink data in the first subframe of the first radio frame and transmit a downlink data in the second subframe of the first radio frame after transmitting the first configuration message.

As traffic may exhibit on-off bursty patterns, a communication system could also be configured to turn off one or more downlink or uplink subframes. Energy savings and interference reductions could be achieved when there is no communication in a certain subframes. Therefore, the present disclosure proposes a signaling and a configuration methodology for a dynamic dormant communication system. To achieve the goal of dynamically adjusting a subframe configuration and to enter dormant subframes, a signaling mechanism would be provided among base stations and UEs. In addition, dynamic dormant information might be exchanged between base stations and network controllers through backhaul links.

The proposed dynamic dormant mechanism would be initiated by a base station. In other words, when a base station has chosen to dynamically enter a dormant mode, the base station would turn off one or more subframe(s) in which no data would be transmitted or received. A dormant subframe could either be a downlink subframe or an uplink subframe. It should be noted that a special subframe of FIG. 1 could be categorized as a downlink subframe. The proposed dynamic dormant mechanism may set dormant a subframe which has been previously activated as an anchoring subframe or as a subframe configured according to one of the seven conventional TDD configurations or as a dynamically activated subframe.

Figure 10:
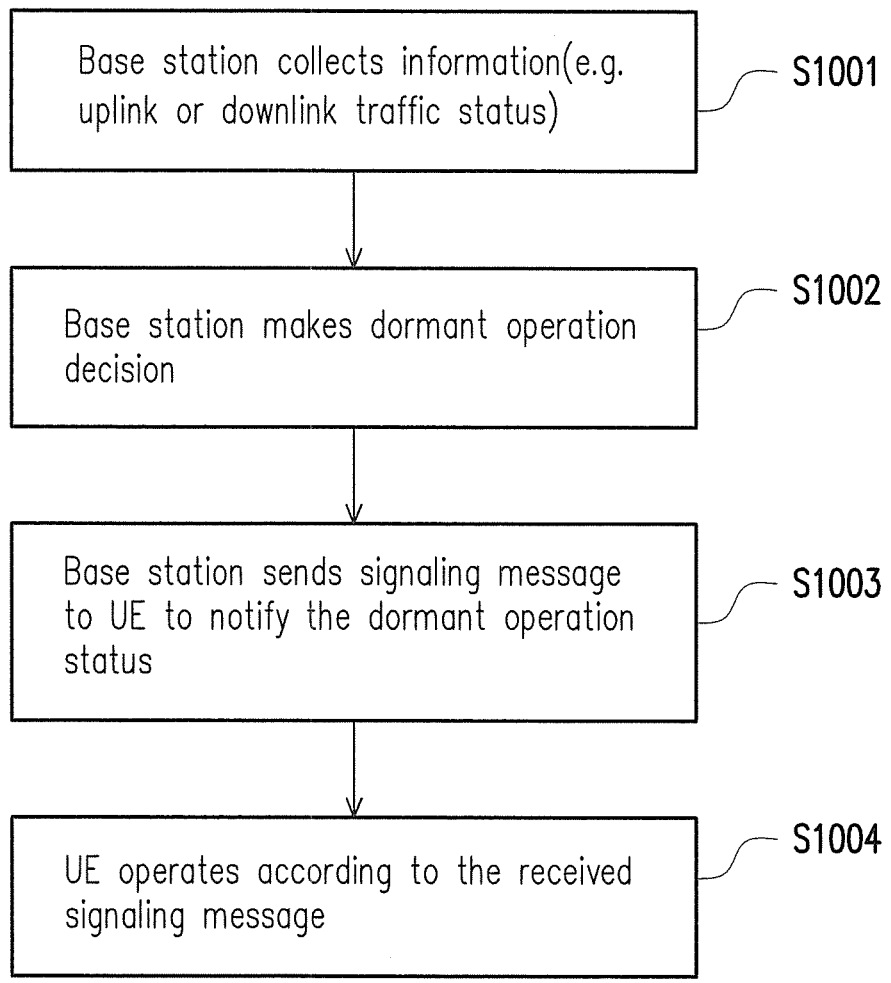
FIG. 10 is a flow chart which illustrates a dormant mode operation in accordance with an exemplary embodiment of the present disclosure.

In one of the exemplary embodiments, the proposed dynamic dormant mechanism could operate according to FIG. 10 to be explained as follows. In step S1001, a base station would collect and analyze the instantaneous traffic information such as the current uplink traffic status or the current downlink traffic status. In step S1002, the base station could make a decision to enter a dormant operation based on the instantaneous traffic information. For example, the base station could decide to turn off one or more subframes when the current data traffic is very low volume or nearly non-existent. In step S1003, the base station would send a signaling message to one or more UEs to notify the dormant operation status including the one or more subframes which would be set to dormant. In step S1004, upon receiving the signaling message to the one or more UEs to notify the dormant operation status, the one or more UEs would enter a power saving mode (i.e. the dormant operation). During the power saving mode, the one or more UEs may actively uplink and downlink data in dormant subframes.

The signaling message to configure the dormant operation could be sent from a base station to one or more UEs through one of a media access control (MAC) message, a radio resource control (RRC) reconfiguration message, and a physical downlink control channel (PDCCH).

The signaling message to configure the dormant operation may contain a new Radio Network Temporary Identifier (RNTI) which would be used by a base station to be delivered to one or more UEs for the purpose of the dormant mode configuration. The new RNTI would be known and agreed upon by both the base station and the one or more UE. Upon receiving a signaling message to configure the claimant operation, the UE would decode the signaling message by using the new RNTI to receive information related to the dynamic dormant operation. In one of the exemplary embodiments, one of the new RNTI could be used by an entire cell to configure the dynamic dormant operation. In another one of the exemplary embodiments, UEs could be divided into several groups with each group using a unique new RNTI so that a group of UEs can be configured by a single signaling message for dormant mode operation.

Figure 11A:
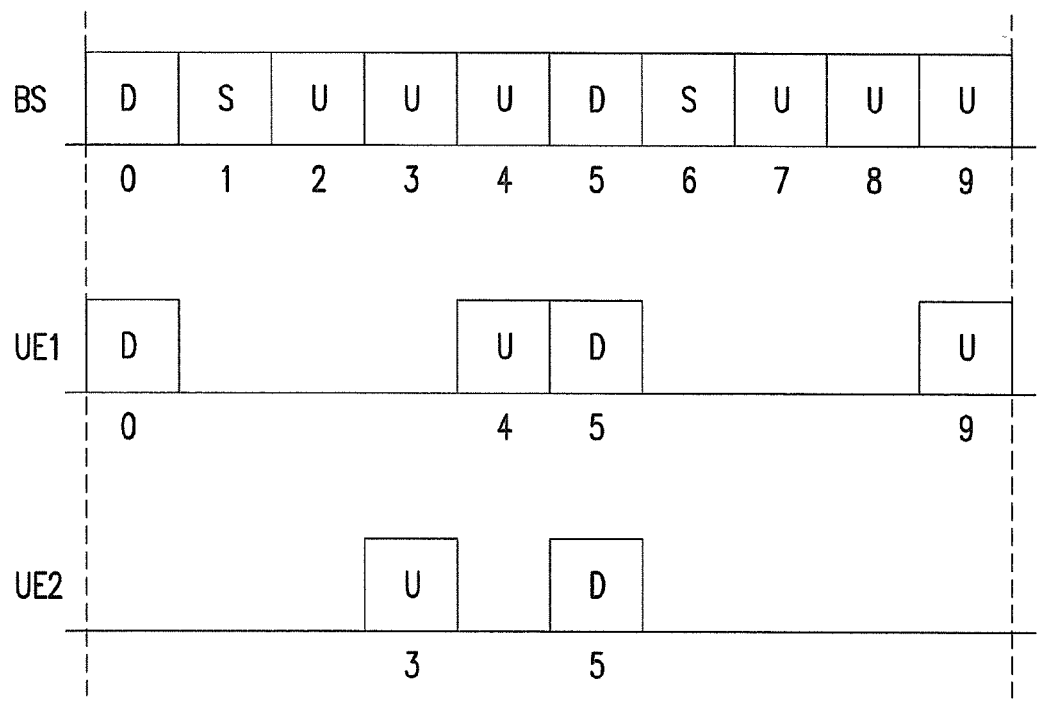
FIG. 11A illustrates an example of a conventional TDD operation among a base station and at least two UEs.
Figure 11B:
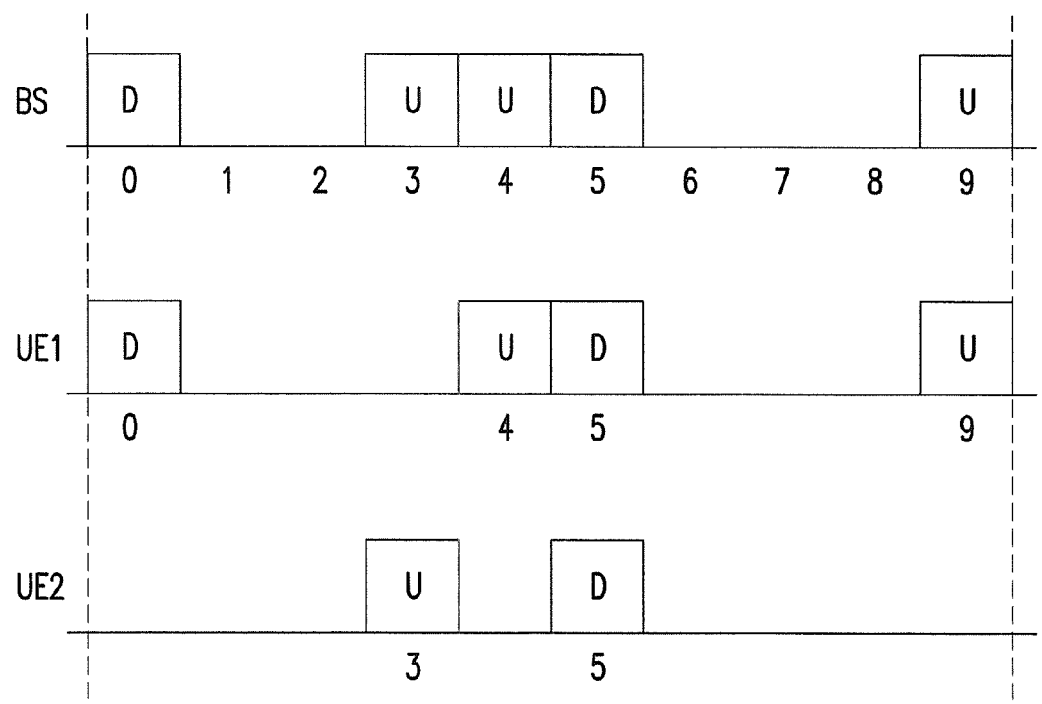
FIG. 11B illustrates a dynamic dormant base station operation among a base station and at least two UEs in accordance with an exemplary embodiment of the present disclosure.

The operation of the dormant mode configuration could be elucidated by FIG. 11A and FIG. 11B. FIG. 11A illustrates an example of a conventional TDD operation among a base station and at least two UEs. In this example, a base station sets a subframe pattern a using TDD configuration 0. The UE1 that is served by the base station has been scheduled (i.e. received downlink grants) for downlinks at subframes 0 and subframe 5, and UE1 has been scheduled for uplinks at subframes 4 and 9. The UE2 that is also served by the same base station has been scheduled for an uplink transmission at subframe 3 and a downlink transmission at subframe 5.

The scenario of FIG. 11B is based on the example of FIG. 11A, except that for FIG. 11B, a base station has dynamically set dormant at subframes 1, 2, 6, 7, and 8 in order to adjust to a decrease of traffic demands. Upon receiving a configuration signaling message containing the dynamic dormant configuration, UE may decode the configuration signaling message using a new RNTI. After successfully decoding the configuration signaling message using the new RNTI, the UE would then obtain the configuration information to set dormant subframes 1, 2, 6, 7 and 8.

A first base station may transmit a signaling message to a nearby base station such as a second base station within the interference range in order to notify dormant a configuration that is currently being used and parameters related to the dormant operation. The signaling message could be transmitted through an inter-base station interface such as the X2 interface. Upon receiving the signaling message from a first base station which is going to set at least one subframe dormant, the nearby or second base station may adjust the interference mitigation strategy such as by taking reduced interference level from neighboring cells into consideration and by adjusting transmission power levels accordingly. For example, the second base station may schedule more transmissions in subframes which have been indicated as dormant in neighboring cells especially under the circumstance that the subframes which have been indicated as dormant have reduced interference levels measured by the second base station.

In general, the signaling message to be sent from one base station to another base station may include a binary indicator which indicates whether the dormant mode of operation has been turned on or off, a binary indicator which indicates whether the level of dormant state is high or low, a few bits to explicitly state the actual dormant pattern, or a set of subframes which have been configured for dormant mode of operation.

Figure 12:
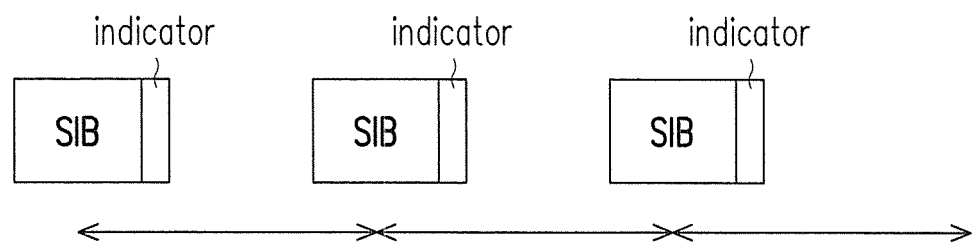
FIG. 12 illustrates a signaling scheme using a SIB and an indicator to support dynamic dormant mode operation in accordance with an exemplary embodiment of the present disclosure.

A bases station may also announce its capability of support dormant operation. For example, a signaling for capability announcement might be sent periodically through the system information (SI). According to one of the exemplary embodiments, FIG. 12 shows a system information block (SIB) containing an indicator which could be a first binary bit indicating whether the capability for dynamic dormant operation or the aforementioned dynamic activation operation is supported. The SIB may contain a second binary bit indicating whether the dormant mode of operation is currently active. The SIB may contain a third binary bit indicating whether a setting related to the dormant mode of operation has been changed. The first, second, and third binary bit could be located in a new system information block that is not currently allocated or could be attached to an existing system information block.

Figure 13:
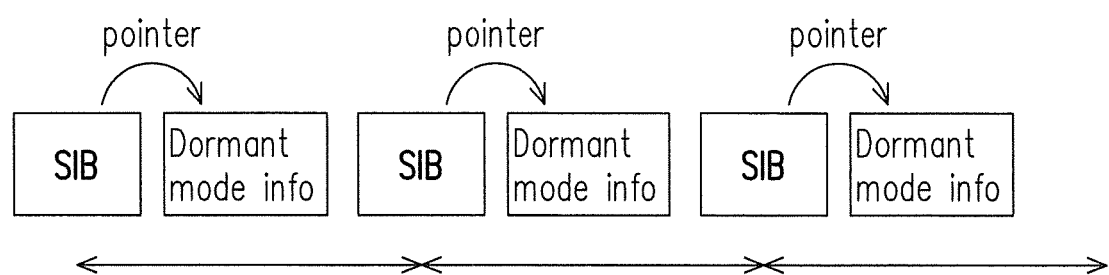
FIG. 13 illustrates a signaling scheme using a SIB and a pointer to support dynamic dormant mode operation in accordance with an exemplary embodiment of the present disclosure.

FIG. 13 illustrates using a pointer which points to detailed configuration information related to dormant mode of operation in accordance with one of the exemplary embodiments of the present disclosure. According to FIG. 13, upon receiving the SIB by a UE, the UE would locate within the SIB a pointer which would point to information related to the dormant mode of operation. The pointer could point to a resource within the same system information block or a resource located in a different system information block. The information related to the dormant mode of operation may include, for example, a dormant pattern containing a sequence of bits which represents whether a subframe is active or dormant. For example, a bit sequence of 01111110 could be used to indicate that the first and the last subframe are set to dormant.

A UE may also report its capability to support the dormant operation. For example, a UE may send a message to a base station to indicate whether the UE is capable of decoding the signaling message that indicates a subframe is configured to be dormant. For example, if the UE is unable to decode a configuration signaling message using a new RNTI, the UE may transmit to a base station a message indicating the failure to decode.

A base station may transmit a signaling message to a network controlling entity (e.g. SON server) to inform the network controlling entity of the dormant mode of configuration. The network controlling entity may also relay such signaling message to another base station. For example, the signaling message may carry suggested dormant mode policy. The message may also carry a specific dormant mode configuration command so that a base station receiving the command may configure the dormant mode operation according to the receiving signaling message.

The dormant mode of operation may contain advantages to be described in the followings. With dormant mode operation, the base station having dormant subframes would save energy. With dormant mode operation, the devices served by the dormant base station may also enter the dormant mode of operation as its serving base station enters the dormant mode and would consequently save energy. Within the period of the dormant subframes, neighboring cells may experience reduced interference level since there is no uplink or downlink data transmission.

Figure 14:
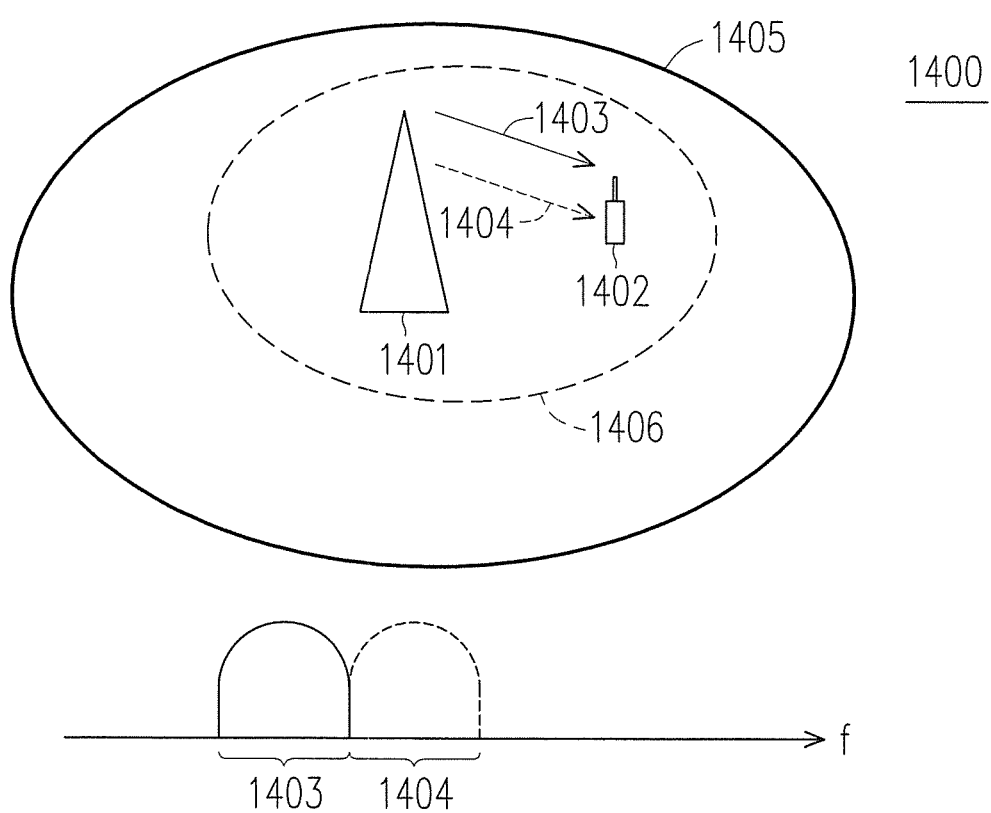
FIG. 14 illustrates an exemplary wireless communication system which utilizes multiple component carriers.

A signaling mechanism could be used to implement the aforementioned dynamic activating operation or the dynamic dormant operation in a wireless communication system which utilizes multiple component carriers. FIG. 14 illustrates an example of a wireless communication system 1400 which utilizes the proposed signaling mechanism in a communication system using multiple component carriers in a carrier aggregation operation. The exemplary wireless communication system 1400 would include at least but not limited to one or more BS 1401, one or more UE 1402, and one or more network entities (not shown) connected to the one or more BS 1401 via a backhaul link. The exemplary wireless communication system 1400 operating under carrier aggregation would include at least two component carriers, a primary component carrier 1403 and a secondary component carrier 1404. The primary component carrier 1403 would serve the primary serving cell 1405, and the secondary component carrier would serve the secondary serving cell 1406. The range of the primary serving cell 1405 and the range of the secondary serving cell 1406 could be completely or partially overlap with each other. The primary component carrier 1403 would mostly be used to carry important information such as signaling information but could also be used to carry user data. The secondary component carrier 1404 would mostly be used to carry user data but may also be used to carry signaling information. When the data traffic is heavy between a base station and user equipments in general, multiple secondary component carriers could be aggregated and be dynamically configured in carrier aggregation operation. However, when the data traffic is not heavy between a base station and user equipments in general, one or more component carriers could dynamically be set to be dormant.

Figure 15A:
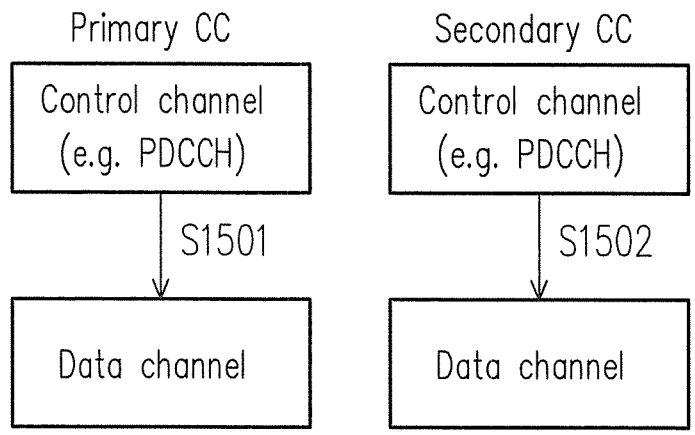
FIG. 15A illustrates a same-carrier signaling scheme for configuring component carriers in accordance with one of the exemplary embodiments.

FIG. 15A illustrates a same-carrier signaling scheme for configuring component carriers in accordance with one of the exemplary embodiments. Under the same-carrier signaling scheme, a primary component carrier would carry signaling information that would allocate radio resources in the same primary component carrier, and similarly, a secondary component carrier would carry signaling information that would allocate radio resources in the same secondary component carrier. For example, in step S1501, a control channel such as a physical downlink control channel (PDCCH) of the primary component could carry resource allocation information to configure a data channel in the same primary component carrier. Also in step S1502, a control channel of the secondary component carrier could carry resource allocation information to configure a data channel in the same secondary component carrier.

Figure 15B:
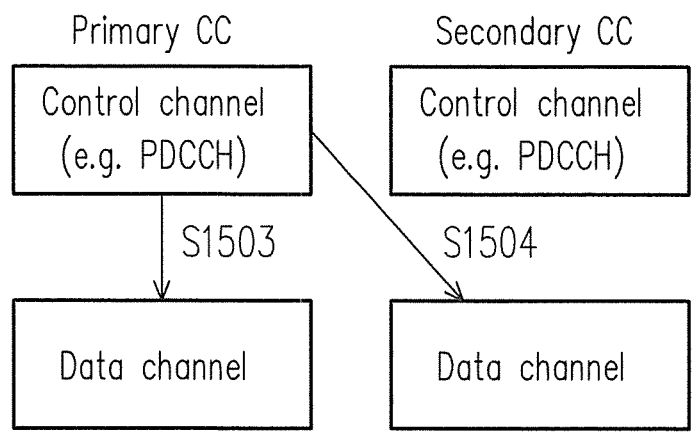
FIG. 15B illustrates a cross-carrier signaling scheme for configuring component carriers in accordance with one of the exemplary embodiments.

FIG. 15B illustrates a cross-carrier signaling scheme for configuring component carriers in accordance with one of the exemplary embodiments. Under the cross-carrier signaling scheme, a primary component carrier would carry signaling information that would allocate radio resources in the same primary component carrier and also in a secondary component carrier that has a different frequency spectrum from the primary component carrier. For example, in step S1503, a control channel such as a physical downlink control channel (PDCCH) of the primary component could carry resource allocation information to configure a data channel in the same primary component carrier. Also in step S1504, the same control channel of the primary component carrier could carry resource allocation information to configure a data channel in the secondary component carrier that operates under a different frequency spectrum from the primary component carrier.

Figure 16:
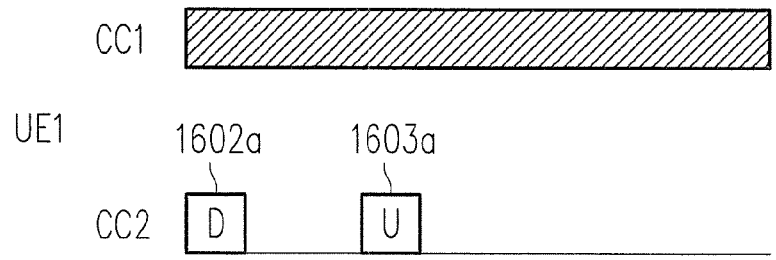
FIG. 16 illustrates non-overlapping radio resource allocation in accordance with one of the exemplary embodiments.
Figure 16:
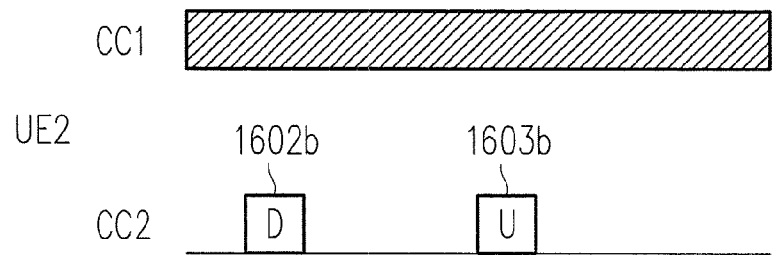

FIG. 16 illustrates non-overlapping radio resource allocation in accordance with one of the exemplary embodiments. Under this scenario, the component carrier (CC)1 and CC2 are aggregated and operate under different frequency spectrums. Both CC1 and CC2 would be used to serve at least UE1 and UE2, and CC1 is assumed to be completely allocated. In this exemplary embodiment, the subframes 1602a and 1602b of CC2 have been configured to be downlink subframes, and the subframes 1603a and 1603b of CC2 have been configured to be uplink subframes. Since subframes 1602a and 1603a serving UE1 and subframes 1602b and 1603b serving UE2 are set to different subframes in CC2, this exemplary resource allocation scenario would provide more resources to UE1 and UE2 respectively.

Figure 17:
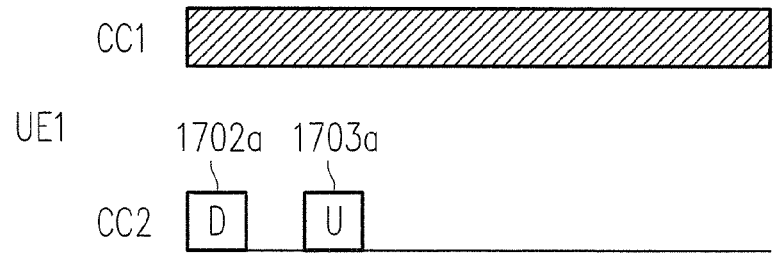
FIG. 17 illustrates coordinated radio resource allocation in accordance with one of the exemplary embodiments.
Figure 17:
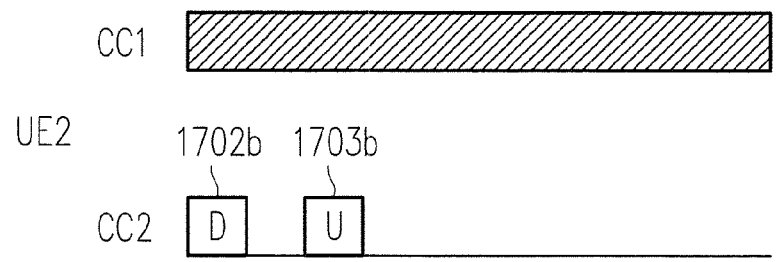

FIG. 17 illustrates coordinated radio resource allocation in accordance with one of the exemplary embodiments. Under coordinated radio resource allocation, as shown in this example, the carrier aggregation operation would be configured in a per-device basis. Thus, multiple devices could have the same (or largely overlapped) active subframe configuration. More specifically, downlink subframe 1702a serving UE1 and downlink subframe 1702b serving UE2 would be allocated in the same or largely overlapping resources, and also uplink subframe 1703a serving UE1 and uplink subframe 1703b serving UE2 would be allocated in the same or largely overlapping resources. Consequently, CC2 would have more dormant resources so that a base station would be able to save more energy, to have greater flexibility to allocate other resources for other uses, or to better cope with interferences of nearby base stations.

Figure 18:
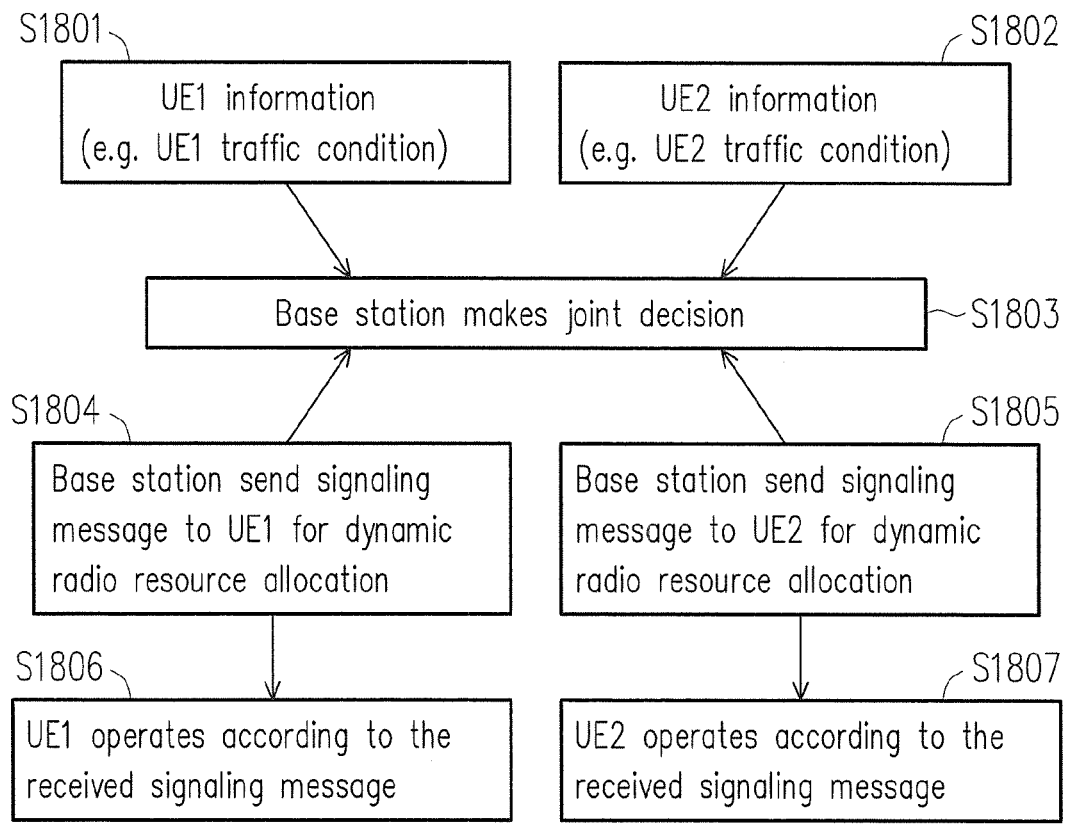
FIG. 18 is a flow chart which shows an interaction between UEs and a base station in accordance with one of the exemplary embodiments.

FIG. 18 is a flow chart which shows an interaction between UEs and a base station in accordance with one of the exemplary embodiments. Even though FIG. 18 shows two UEs, the same concept could be extended to more than two UEs. In carrier aggregation configuration and signaling could be exchanged among a base station and UEs in a per-UE basis such that each UE would be configured individually. However, a base station may also consider dynamic radio resource allocation decision in a per-cell basis as it could be beneficial to set the same subframe of the same component carriers in the same time slot into dormant for all UEs in order to reduce energy cost at the BS and to reduce interference to a neighboring cell. This exemplary flow chart shows a mechanism to collect traffic conditions in a per-UE basis, to make decision in a per-cell basis, and to transmit signaling messages to allocate radio resources in a per-UE basis.

In step S1801, the current data traffic condition (e.g. the data volume, bandwidth consumption, bit rate, etc.) of UE1 would be transmitted to a base station. In step S1802, the current traffic condition (e.g. the data volume, bandwidth consumption, bit rate, etc.) of UE2 would be transmitted to the same base station. In step S1803, the base station would make resource allocation decisions for an entire cell as a whole and thus would in turn allocate radio resources dynamically for UE1 and UE2. In step S1804, the base station would transmit a signaling message to UE1 to dynamically allocate radio resources, and also the base station does likewise to UE2 in step S1805. In step S1806, UE1 would operate according to the received signaling message from the base station. In step S1807, UE2 would also operate according to the received signaling message from the base station. FIG. 19~FIG. 27 contains further details as for how to dynamically allocate resources.

Figure 19:
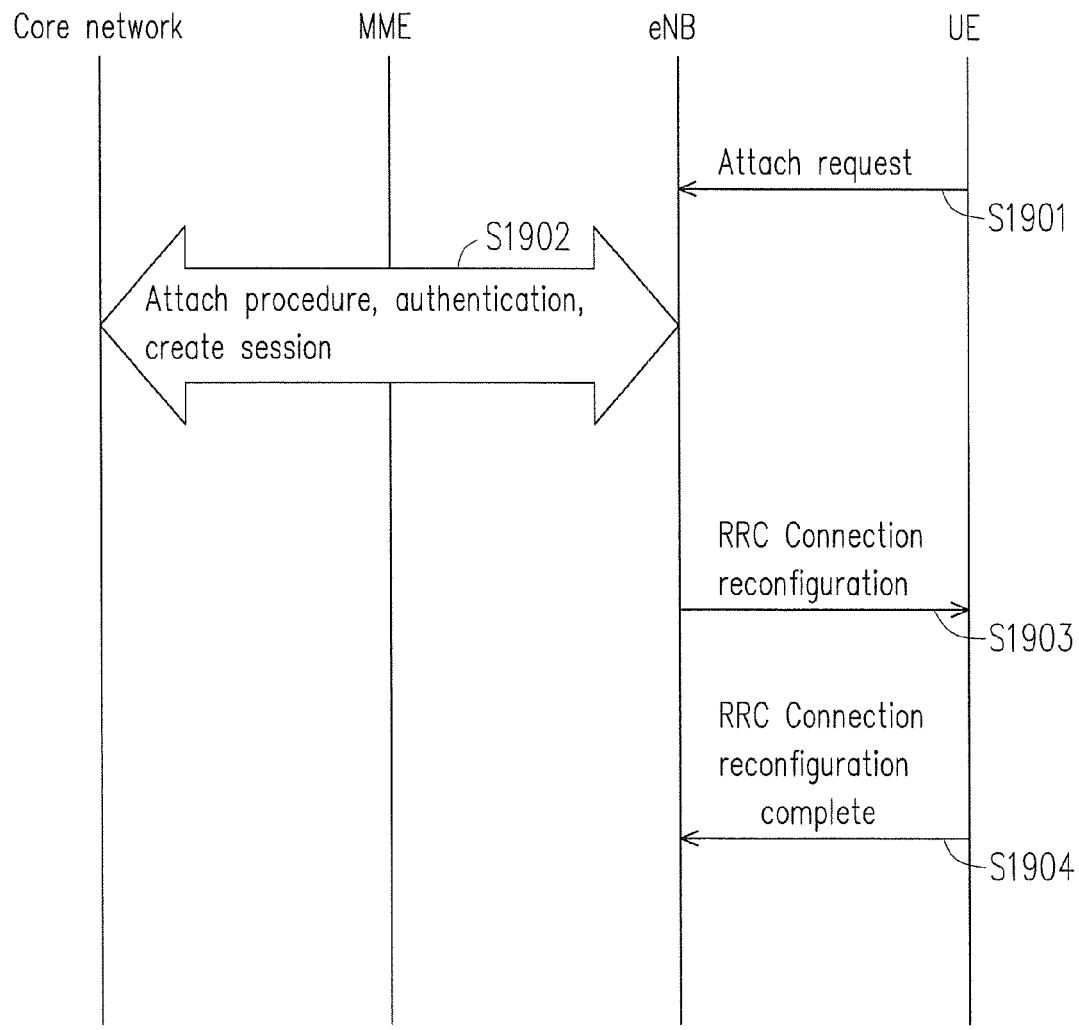
FIG. 19 illustrates a signaling flow to dynamically allocate radio resource for a UE in accordance with one of the exemplary embodiments.

FIG. 19 illustrates a signaling flow to dynamically allocate radio resource for a UE during an attachment process in accordance with one of the exemplary embodiments. A base station may announce or advertise its ability to support dynamic radio resource allocation in a carrier aggregation operation to one or a group of UEs. For example, a base station may use an indicator in a new or in an existing System Information Block to indicate whether the network would support dynamic radio resource allocation. By supporting dynamic radio resource allocation, the base station would need to be able to at least configure and de-configure each individual subframe of a radio frame of a primary or secondary component carrier. Also the base station would need to be able to activate or deactivate each individual subframe that has been configured or de-configured.

Similarly, a UE may also indicate whether the UE is capable of supporting dynamic radio resource allocation. During an attachment process, a UE may signal its support for dynamic radio resource allocation by using an indicator embedded in an Attach Request message in step S1901 of FIG. 19. In step S1902, in response to the Attach Request message the attach procedure with the network would continue as the network would perform authentication and create session for the UE.

Alternatively, a base station and/or a UE may also indicate the capability to support dynamic radio resource allocation in a carrier aggregation operation during a UE attachment phase when Radio Resource Control (RRC) messages are being exchanged in steps S1903~S1904. For example, during the setup procedure of a component carrier, the dynamic radio resource capability and configuration might be included in the setup message signaling for carrier aggregation initialization. When a carrier component has been initialized, the network or base station may according to the current data traffic determine the configuration of subframes of component carriers by setting at least a certain subframe to downlink and/or at least a certain subframe to uplink and/or at least a certain subframe to special. For example, during a UE attach process, the RRC Reconfiguration message in step S1903 may include an indicator or a description for the dynamic radio resource capability of a secondary component carrier, and the UE would also indicate whether it possesses the same capability in the RRC Reconfiguration Complete message in step S1904. The RRC Reconfiguration message of step S1903 may also be embedded with subframe configurations of each of the component carriers.

Figure 20:
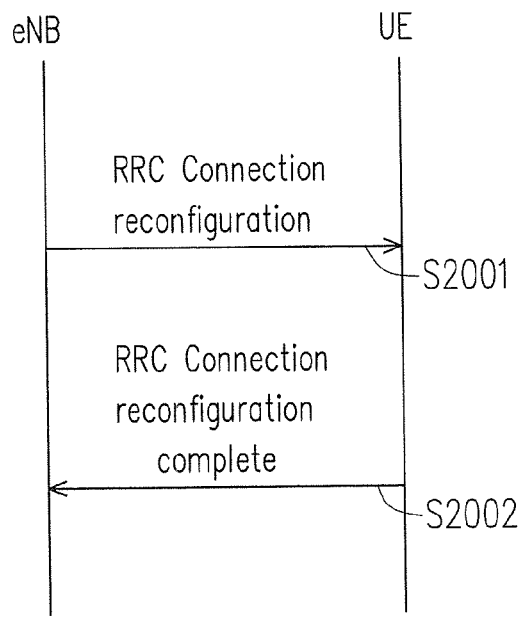
FIG. 20 illustrates a signaling flow to dynamically update radio resource allocation for a UE in accordance with one of the exemplary embodiments.

After a component carrier has been configured, the component carrier could be re-configured dynamically while the carrier aggregation is already in operation. The reconfiguration of one or more subframes of a component carrier could be accomplished by indicators embedded in a subsequent RRC reconfiguration message sent from a base station to a UE. FIG. 20 illustrates a signaling flow to dynamically update radio resource allocation for a UE in accordance with one of the exemplary embodiments. In step S2001, an eNB would transmit a RRC Connection Reconfiguration message to a UE which would transmit a RRC Connection Reconfiguration Complete in step S2002. The RRC Connection Reconfiguration message in step 2001 would include an indication of the dynamic radio resource capability as well as a configuration of radio resource allocation setting. For example, if the eNB suddenly experiences a spike in network downlink traffic, the eNB would transmit to the UE the RRC Reconfiguration message which would reconfigure some or most of the subframes to downlink. If the eNB later experiences very little traffic instead, the eNB would transmit to the UE the RRC Reconfiguration message which would reconfigure some or most of the subframes to dormant in order to conserve energy. In general, an eNB could configure and activate a subframe in order to respond to a change of network traffic, or the eNB could deactivate and de-configure the subframe.

Figure 21:
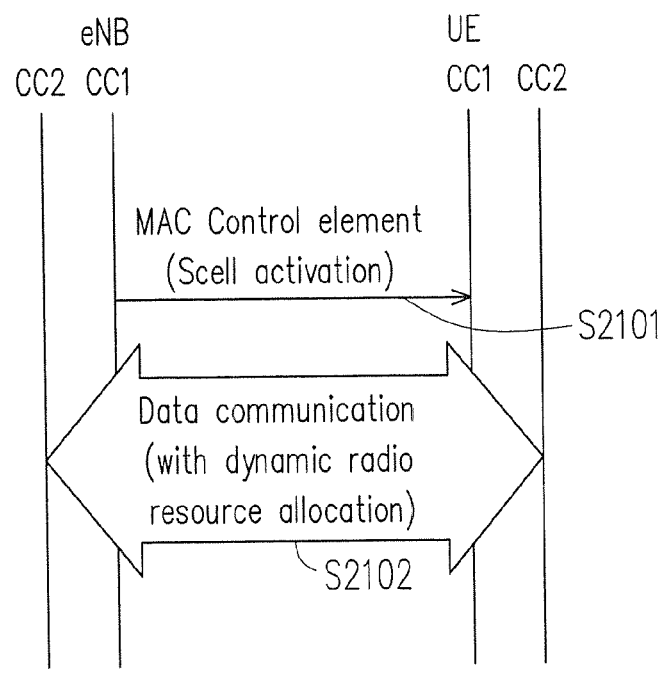
FIG. 21 illustrates a signaling flow to activate a secondary component carrier in accordance with one of the exemplary embodiments.

FIG. 21 illustrates a signaling flow to activate a secondary component carrier in accordance with one of the exemplary embodiments. In the exemplary embodiment of FIG. 21, information related to the activation of dynamic radio resource allocation would be included in a MAC control element. After a component carrier has been configured, the component carrier may or may not be actually activated but needs to be activated before the component carrier could carry data. In other words, the activation of a component carrier via a signaling message could be needed before starting to transmit data on a component carrier. For example, in order to activate a component carrier with dynamic radio resource capability, a MAC message such as a MAC control element with a secondary cell (Scell) activation could be transmitted from an eNB to a UE. The activation signaling message would be embedded with a specific command for dynamic radio resource allocation setting. In step S2101, an eNB would transmit to a UE a secondary cell (Scell) activation command to activate a secondary component carrier via a MAC control element in a primary component carrier. In step S2102, data communication would occur between the eNB and the UE, and a secondary component carrier that is being dynamically configured would be utilized to carry out such communication.

If a fast signaling mechanism with low latency would be needed to dynamically activating or setting dormant one or more subframes of a radio frame of a component carrier, a physical layer signaling message could be used to accomplish the fast signaling in order to be more dynamic. For example, a physical downlink control channel (PDCCH) could be used by a base station to configure one or a group of UEs for dynamic radio resource allocation. A radio network temporary identifier (RNTI) could be used to identify the one UE, or a group RNTI could be used to identify a group of UEs. The group RNTI could also be used to identify UEs in a per-cell basis. The RNTI would be predetermined as a new RNTI that is not currently defined in a standard at this point in time.

Figure 22:
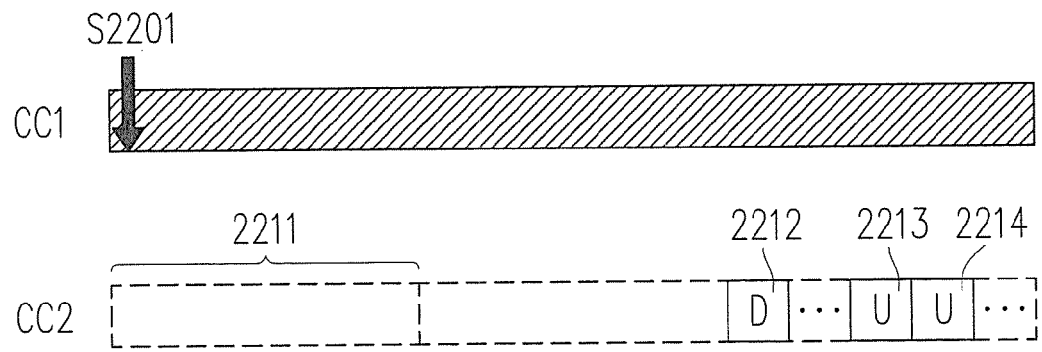
FIG. 22 illustrates a timing diagram of dynamic configuration of component carriers in accordance with one of the exemplary embodiments.

FIG. 22 illustrates a timing diagram of dynamic configuration of component carriers in accordance with one of the exemplary embodiments. The configuration of a component carrier might be effective immediately or with a delay upon receiving a configuration message. According to one embodiment, activation of a component carrier would automatically be accomplished upon the configuration. According to another embodiment, the component carrier would need to be activated apart from configuration. The activation of a component carrier could also be effective immediately or with a delay upon receiving an activation message. The exemplary embodiment of FIG. 22 would show a case of delayed configuration with activation. In step S2201, a signaling message that includes an activation command is sent from an eNB to a UE through the primary component carrier to configure and activate a secondary component carrier that is current dormant (e.g. radio frame 2211) with a two frames delay. The activation message might include configuration of a soft component carrier setting. For the example of FIG. 22, the frame pattern would be a downlink configuration in the $0^{th}$ subframe 2212 and uplink configurations in fourth subframe 2213 and fifth subframe 2214. In an alternative embodiment, the signaling message could also be transmitted on a secondary component carrier, or in other words, on the same component carrier that is going to be configured.

Figure 23:
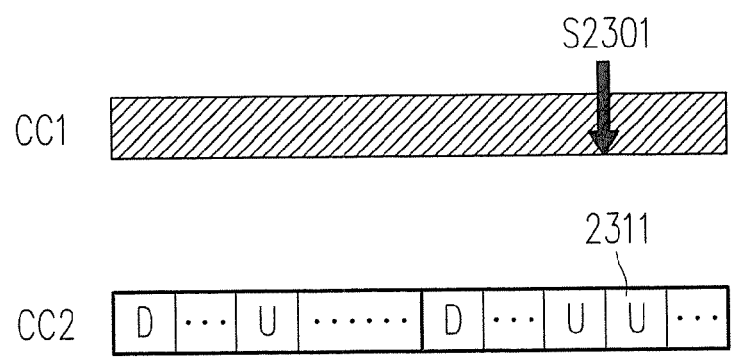
FIG. 23 illustrates the dynamic configuration of a subframe by a dynamic configuration command in accordance with one of the exemplary embodiments.

FIG. 23 illustrates dynamic configurations of a subframe by the reception of an activation command in accordance with one of the exemplary embodiments. In step S2301, a dynamic activation command has been sent from eNB and is received by a UE in the primary component carrier to activate a de-configured subframe 2311. For this exemplary embodiment, the activation command would include an instruction to configured the subframe 2311 as an uplink subframe. Upon receiving the activation command in step S2301, the UE would immediately configure and activate the subframe 2311 as an active uplink subframe in the secondary component carrier.

Figure 24:
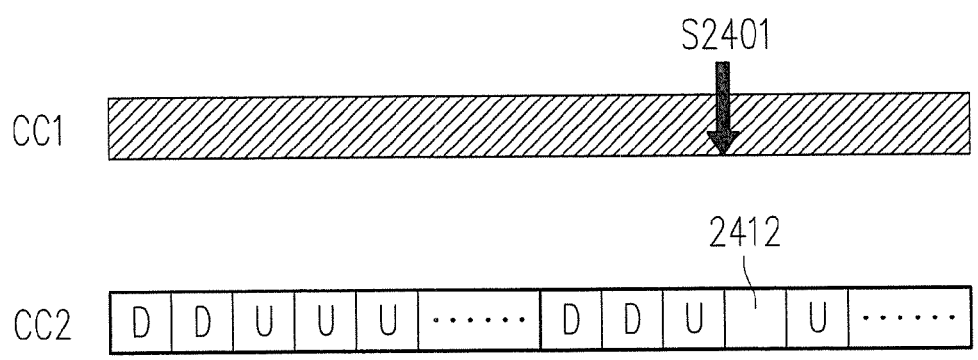
FIG. 24 illustrates the deactivation of a subframe by a dynamic de-configuration command in accordance with one of the exemplary embodiments.

FIG. 24 illustrates dynamic de-configuration or deactivation of a subframe by the reception of a de-activation command in accordance with one of the exemplary embodiments. In step S2401, a dynamic de-activation command has been sent from an eNB and is received by a UE in the primary component carrier to deactivate a configured subframe 2412. For this exemplary embodiment, the deactivation command would include an instruction to de-configure or deactivate the subframe 2412. Upon receiving the deactivation command in step S2401, the UE would immediately de-configure and/or deactivate the subframe 2412 in the secondary component carrier.

Figure 25:
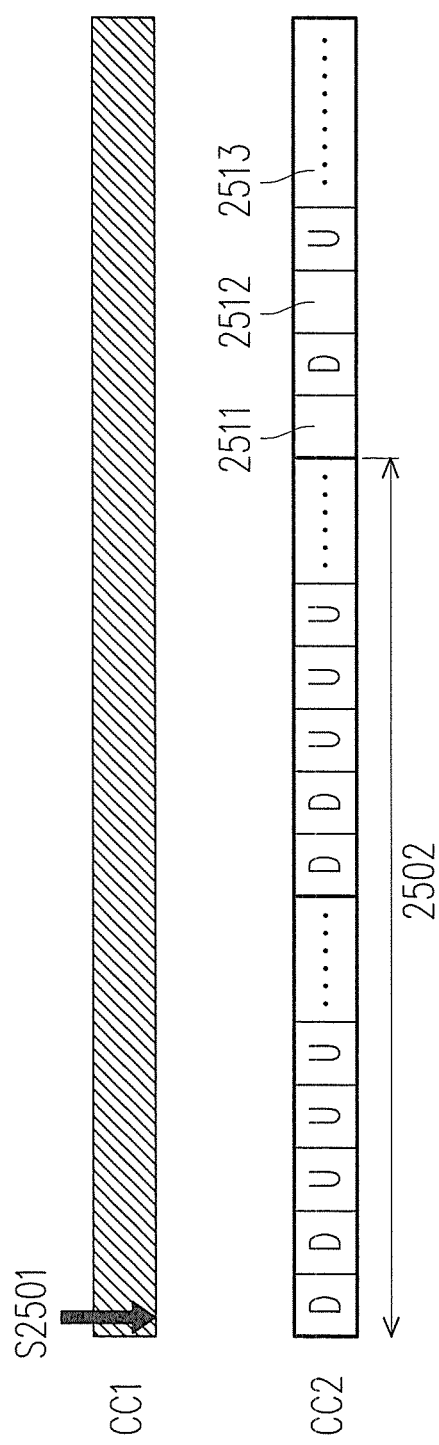
FIG. 25 illustrates dynamic radio resource allocation with a timer in accordance with one of the exemplary embodiments.

FIG. 25 illustrates dynamic radio resource allocation with a timer in accordance with one of the exemplary embodiments. A timer might be used to count the time duration to trigger a dormant subframe configuration or to trigger an active subframe configuration. In step S2501, a UE receives a command to dynamically configure a radio frame by setting dormant the $0^{th}$ subframe 2511, the $2^{nd}$ subframe 2512, and the $4^{th}$ subframe 2513 of a radio frame with a timer which counts a duration that equals to two radio frames. After timer counting the duration 2502, the UE would deactivate subframes 2511, 2512, and 2513 of the subsequent radio frame.

Figure 26:
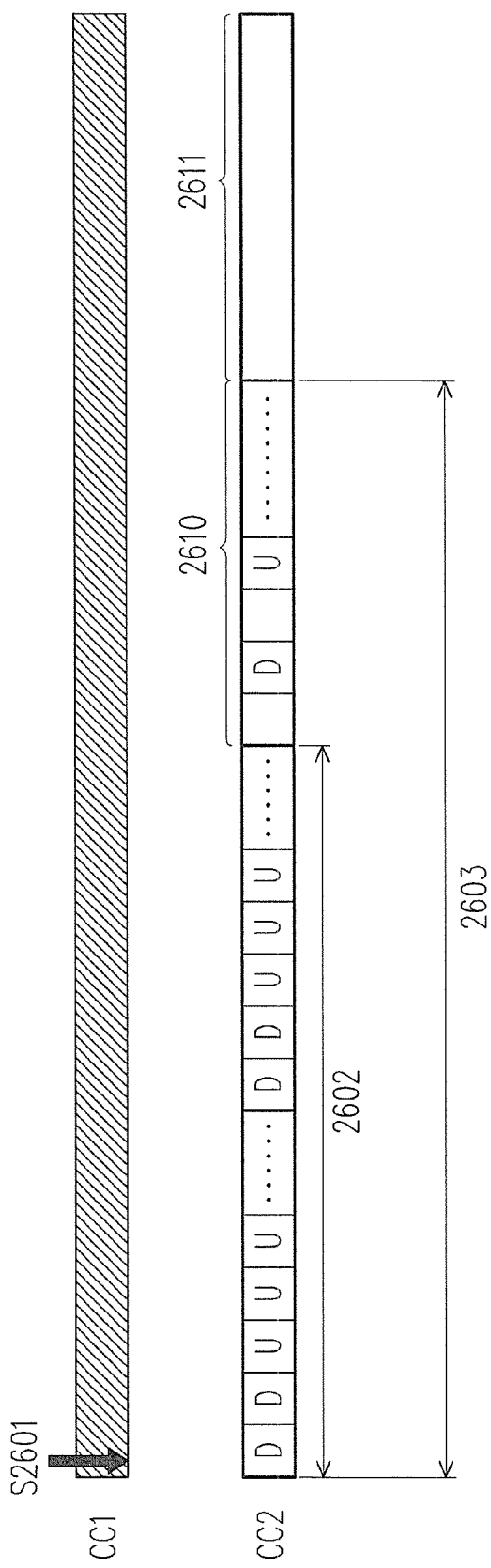
FIG. 26 illustrates dynamic radio resource allocation with multiple timers in accordance with one of the exemplary embodiments.

FIG. 26 illustrates dynamic radio resource allocation with multiple timers in accordance with one of the exemplary embodiments. Even though the embodiment of FIG. 26 shows two timers, more than two timers might be used. One timer might be set for counting the time duration to trigger a first frame pattern, and then another timer might be set for counting the time duration to trigger a second frame pattern. According to one exemplary embodiment, upon receiving a signaling message to configure a timer-based dynamic radio resource allocation operation, a first timer value associated with a first frame configuration would be obtained, and a second timer value associated with a second frame configuration would also be obtained. For example, upon receiving a signal message to configure a timer-based dynamic radio resource allocation operation in step S2601, when a first timer expires after the first duration 2602, the $0^{th}$ subframe and the $2^{nd}$ subframe of the frame 2610 would be set dormant. Also when the second timer expires after the second duration 2603, a completely empty frame pattern would be entered such that a component carrier could be deactivated completely.

Figure 27:
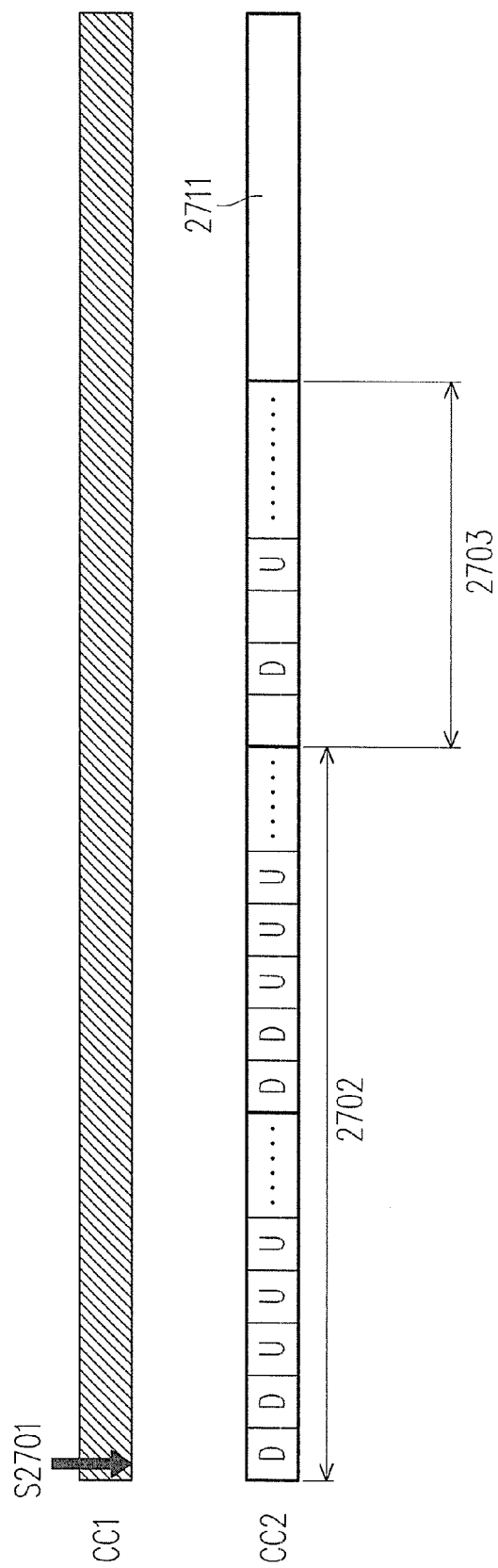
FIG. 27 illustrates dynamic radio resource allocation with multiple timers in accordance with one of the exemplary embodiments.

FIG. 27 illustrates dynamic radio resource allocation with multiple timers in accordance with one of the exemplary embodiments. This exemplary embodiment is similar to FIG. 26 except that the second timer does not start counting until the first timer expires. Upon receiving a signal message to configure a timer-based dynamic radio resource allocation operation in step S2701, when a first timer expires after the first duration 2702, the $0^{th}$ subframe and the $2^{nd}$ subframe of the frame 2703 would be set dormant. Upon the expiration of the second timer after the second duration 2703, a completely empty frame pattern would be entered such that a component carrier could be deactivated completely.

The aforementioned dynamic resource allocation scheme to activate or set dormant subframes in a single carrier or carrier aggregation scheme may also be used in a dual-connecting wireless communication system. The proposed dynamic resource allocation scheme would not only adapt to variable network traffic but also reduce interference under these variable conditions. Although in the disclosure below dual-connecting or dual-connectivity is used, it will be evident for one skilled in the art that the proposed scheme could also be extended to multi-connecting or multi-connectivity scenarios in which two or more connections might be configured to a user device.

Figure 28:
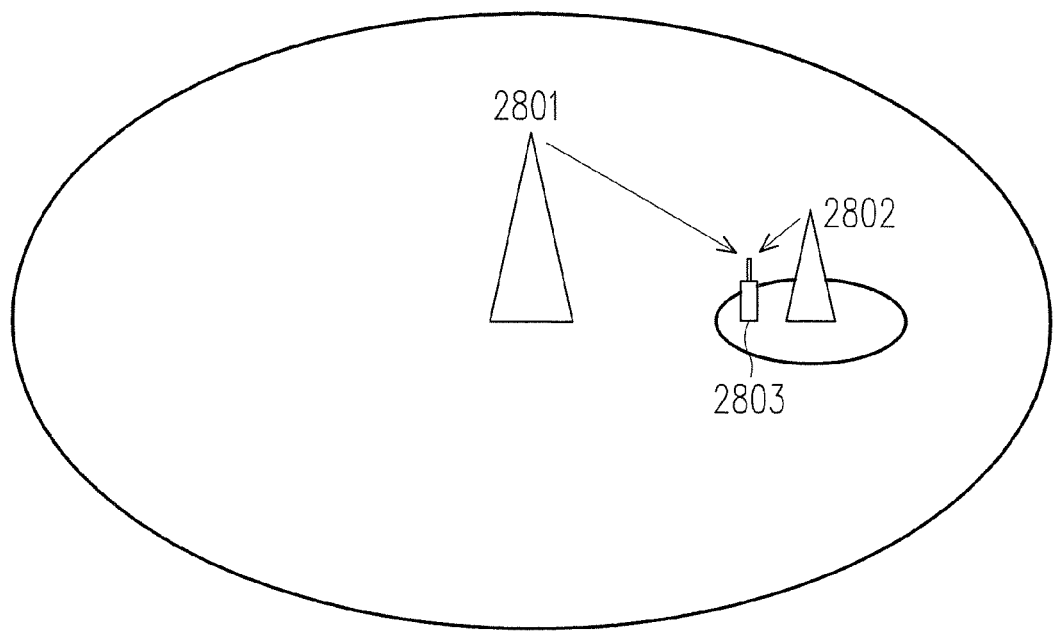
FIG. 28 illustrates a dual connectivity network architecture in accordance with one of the exemplary embodiments.

A dual connectivity scenario for example could be the one shown in FIG. 28. According to FIG. 28, both a Macro cell base station (i.e. eNB) 2801 and a small cell base station 2802 such as a Micro cell eNB, a Pico cell eNB, or a Femto cell eNB may connect to a UE 2803. In this scenario, the Macro cell base station 2801 may provide signaling transmissions to the UE 2803 while the small cell base station 2802 provides data transmissions. However, the present disclosure is not limited to such scheme as the small cell base station 2802 may provide the signaling transmission and the Macro cell base station 2801 may provide the data transmission. In one of the exemplary embodiments, the Macro cell base station 2801 may serve as the primary serving cell and provide the primary component carrier, and the small cell base station 2802 may serve as the secondary serving cell and provide the secondary component carrier. In general, both a Macro cell base station and a small cell base station would be able to send signaling to UEs served under these base stations to dynamically alter the TDD subframe configurations of these UEs such as to dynamically activate or set dormant certain subframes.

Figure 29:
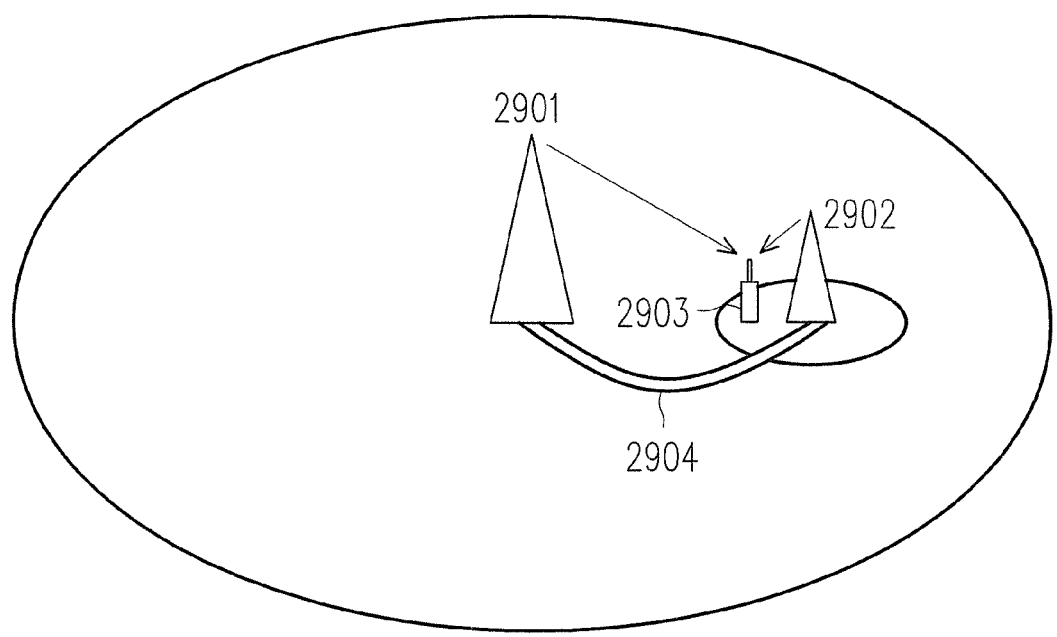
FIG. 29 illustrates a dual connectivity scenario in which a master eNB connects to a secondary eNB through a backhaul link in accordance with one of the exemplary embodiments.

The Macro cell base station and the small cell base station networking scheme such as the scenario shown in FIG. 28 could be configured as a master-slave or master-secondary hierarchical control structure. FIG. 29 illustrates such control structure in which a master eNB connects to a secondary eNB through a backhaul link. The master eNB (MeNB) 2901 would provide a primary connection to the UE 2903, and the secondary eNB (SeNB) 2902 would provide a secondary connection to the UE 2903. The SeNB 2902 would be subordinate to the MeNB 2901 as the MeNB 2901 would be able to communicate to the SeNB 2902 to a backhaul link 2903 such as a X2 interface. The signaling message for dynamic radio resource allocation could be transmitted by the MeNB or the SeNB. The dynamic radio resource allocation could dynamically configure TDD subframes for uplink only, downlink only, or both downlink and uplink.

Figure 30:
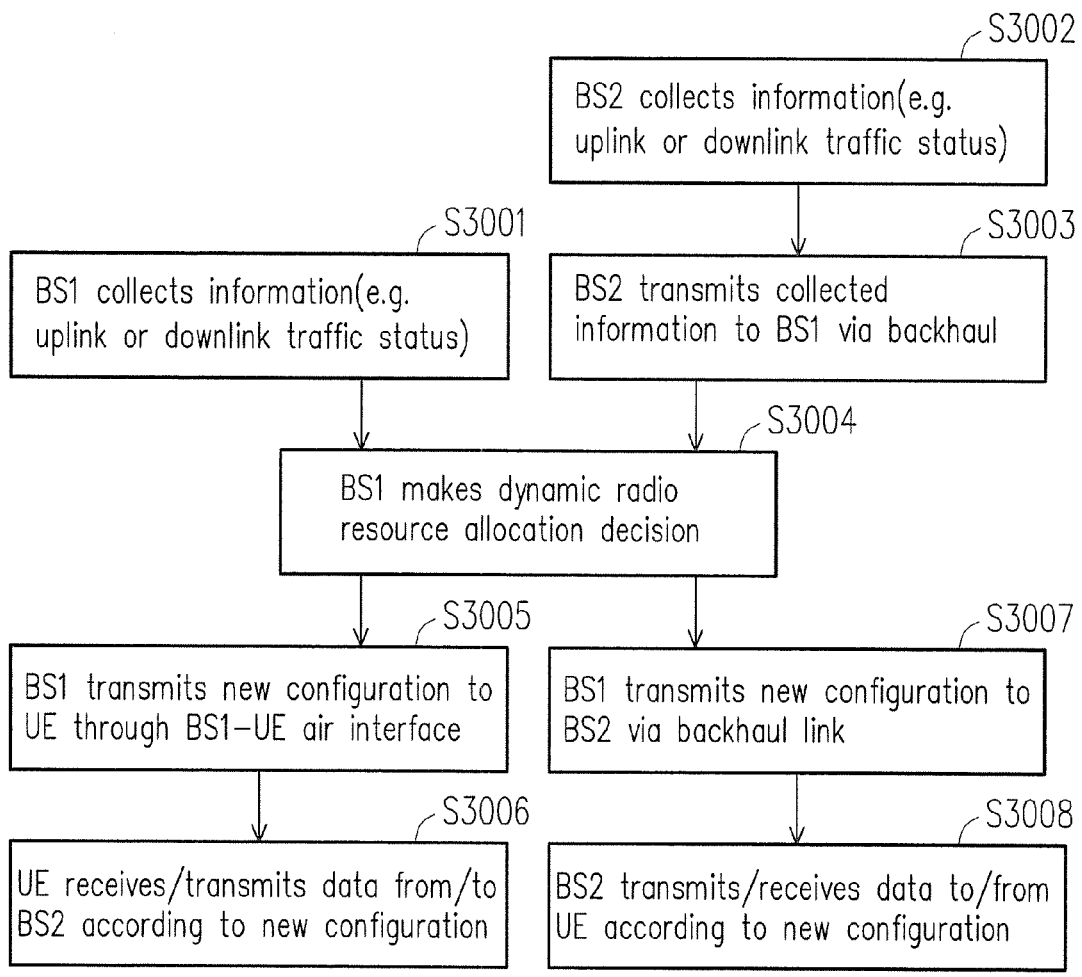
FIG. 30 is a flow chart illustrating dynamic radio resource allocation in a dual-connecting wireless system in accordance with one of the exemplary embodiments.

FIG. 30 is a flow chart illustrating dynamic radio resource allocation in a dual-connecting wireless system in accordance with one of the exemplary embodiments. The steps of FIG. 30 could be implemented by the architecture of FIG. 28 or 29. In step S3001, a first base station (e.g. MeNB) would collect information related to the recent network traffic information experienced by the first base station. The information could be, for example, the recent uplink and downlink traffic status. In step S3002, a second base station (e.g. SeNB) would collect information related to the recent network traffic information experienced by the second base station. In step S3003, a second base station would transmit the collected information to the first base station through a backhaul link. In step S3004, the first base station would make a decision related to dynamic radio resource allocation based on the data from steps S3001 and S3003. In step S3005, the first base station would transmit a new configuration to one or more UEs through a wireless interface. In step S3006, the one or more UEs would transmit and receive data according to the new configuration. In step S3007, the first base station would transmit a new configuration to the second base station through the backhaul link. In step S3008, the second base station would transmit data to the one or more UEs and receive data from the one or more UEs according to the new configuration.

Figure 31:
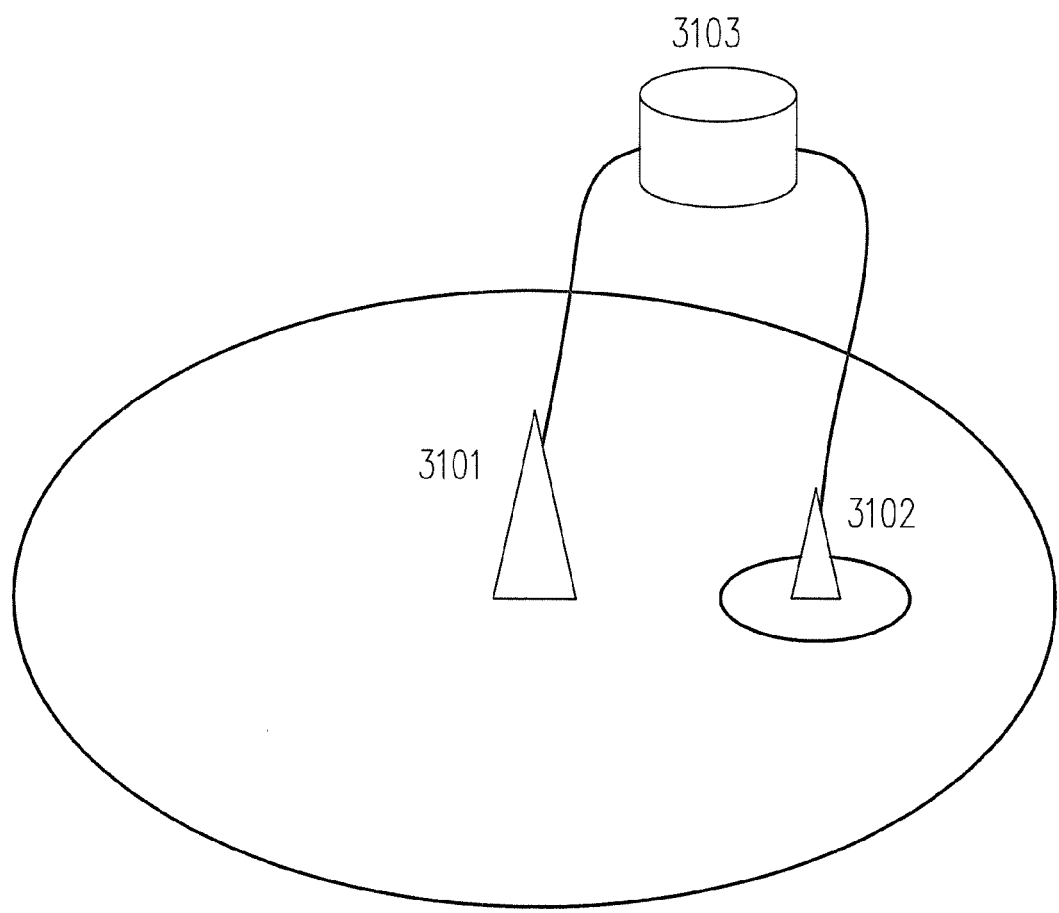
FIG. 31 illustrates a dual connectivity scenario in which a network controller connects to two base stations through a backhaul link in accordance with one of the exemplary embodiments.

Alternatively, the proposed dynamic resource allocation mechanism could be controlled by a network entity as shown in FIG. 31. According to the example of FIG. 31, a first base station 3101 would be connected to a network controller 3103 such as a MME which would then be connected to a second base station 3102. The first base station 3101 could be a Macro cell base station or a primary base station providing a primary component carrier, and the second base station 3102 could be a secondary base station or a small cell base station providing a secondary component carrier. The network controller 3103 would be able to dynamically allocate radio resources based on the recent network traffic experienced by the first base station 3101 and the second base station 3102.

Figure 32:
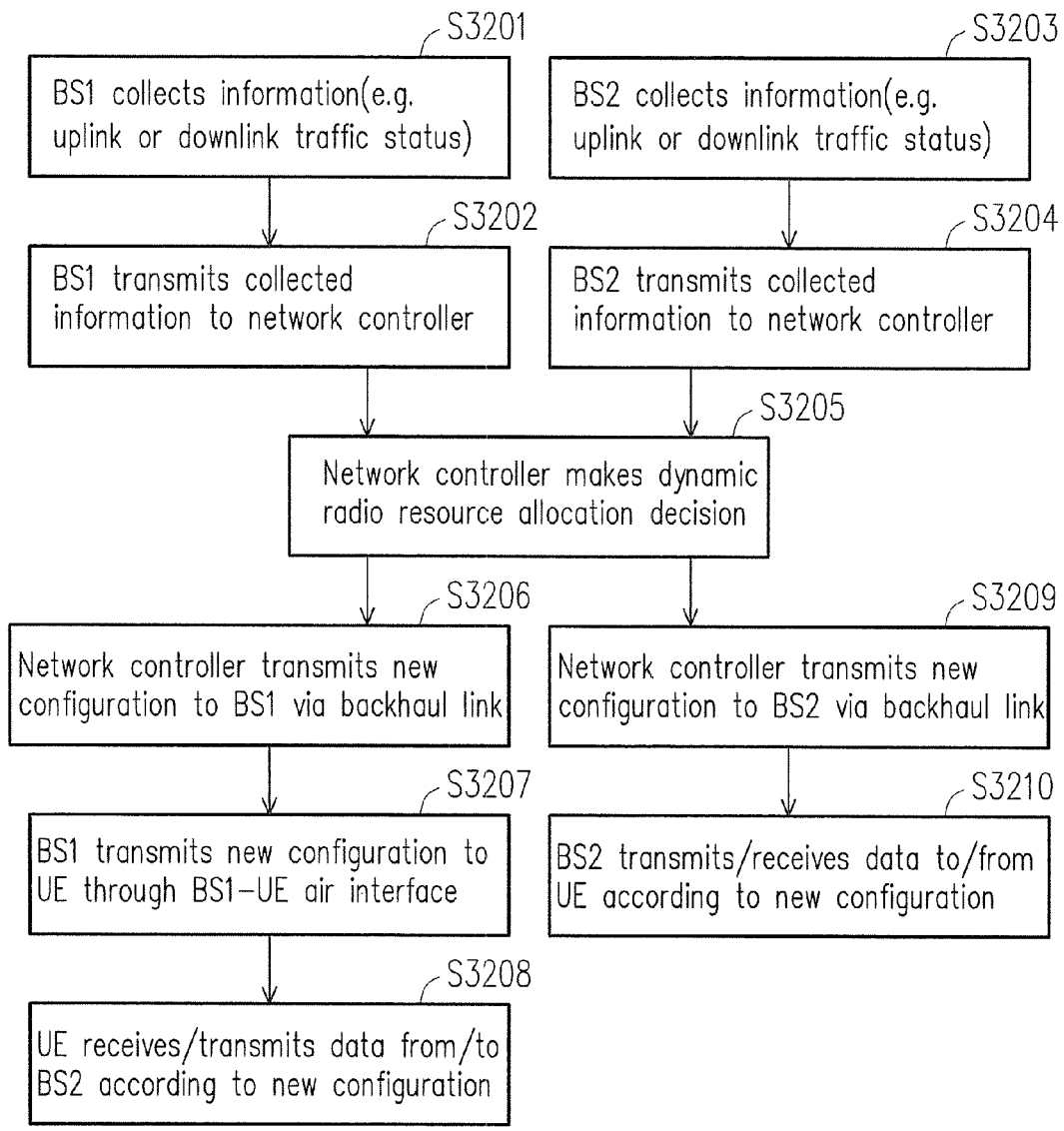
FIG. 32 is a flow chart flow chart illustrating dynamic radio resource allocation in a dual-connecting wireless system in which a network controller connects to a macro base station and a small cell base station in accordance with one of the exemplary embodiments.

FIG. 32 is a flow chart illustrating dynamic radio resource allocation in a dual-connecting wireless system in which a network controller connects to a first base station and a second cell base station in accordance with one of the exemplary embodiments. For example, the first base station could be a Macro cell base station, and the second station could be a small cell base station. In step S3201, a first base station would collect recent network traffic information. The recent network traffic information could be a recent uplink or downlink traffic status. In step S3202, the first base station would transmit the collected recent network traffic information to the network controller. In step S3203, a second base station would also collect recent network traffic information and in step S3204 transmit the collected recent network traffic information to the network controller. In step S3205, the network controller would make a decision to dynamically allocate radio resources according to the collected recent network traffic information from the first base station and the second base station. In step S3206, the network controller may transmit a new dynamic TDD configuration to the first base station via a backhaul link. In step S3207, the first base station would transmit the new dynamic TDD configuration to one or more UEs served by the first base station. In step S3208, the one or more UEs would transmit data to the first base station and receive data from the first base station based on the new dynamic TDD configuration. In step S3209, the network controller would transmit a new dynamic TDD configuration to the second base station via a backhaul link. In step S3210, the second base station would transmit data to and receive data from the one or more UEs according to the new dynamic TDD configuration.

The dynamic resource allocation could be implemented according to the exemplary embodiments of FIG. 33~FIG. 38. In the exemplary embodiment of FIG. 33, a MeNB 3301 may follow the procedure of the steps of FIG. 30 to dynamically configure a SeNB 3302 which has a default TDD subframe configuration via a backhaul link (not shown). Assuming that the SeNB has a default TDD subframe pattern 3311 as shown in FIG. 31, after collecting recent network traffic information experienced by both the MeNB 3301 and the SeNB 3302, the MeNB 3301 has made a decision to configure the SeNB 3302 for a dormant mode of operation. The MeNB 3301 may then transmit a signaling message to the SeNB 3302 via the backhaul link to configure the TDD subframe pattern. For example, the signaling message may contain a bit pattern with each bit corresponding to an on or off pattern. Assuming that the MeNB 3303 has determined to mute subframe index 1, 2, 5, 6 of the TDD subframe pattern 3312 of the SeNB 3302, the signaling message may contain a bit pattern such as 1001100111 with each "0" corresponding to the index of the dormant subframe and each "1" corresponding to the index of the activated subframe. However, the present disclosure is not limited to using such bitmapping scheme. Upon receiving the signaling message, the SeNB 3302 and one or more UEs served under the SeNB 3302 would operate according to the new TDD subframe pattern 3312.

In an alternative embodiment, the SeNB 3302 could dynamically determine a subframe pattern on its own without receiving a signaling message from a MeNB 3301 or a network controller. In an alternative embodiment, instead of receiving a signaling message from a MeNB 3301 to dynamically configure its TDD subframe pattern, the SeNB 3302 could receive the signaling message from a network controller.

Figure 33:
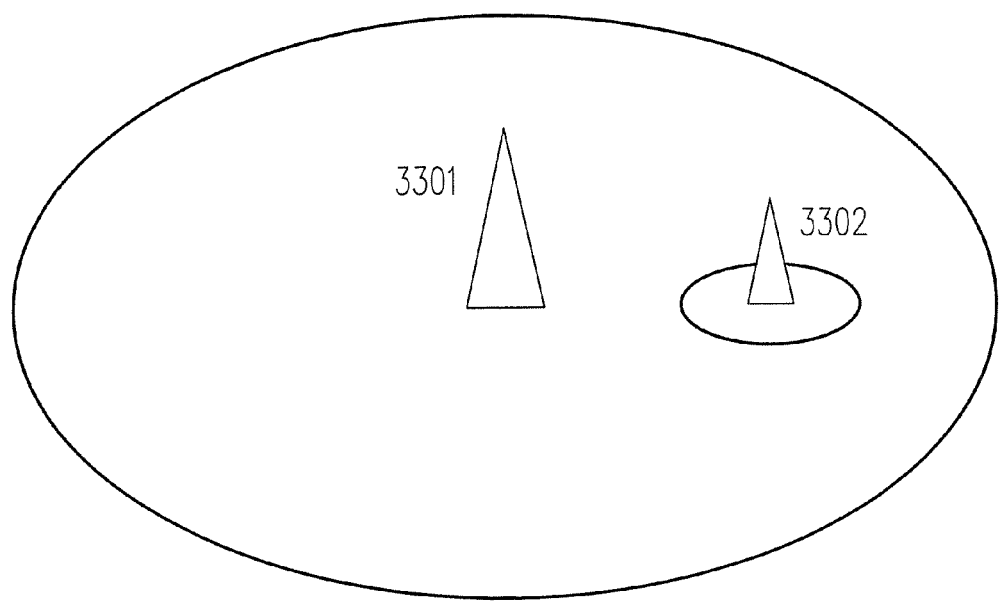
FIG. 33 illustrates dynamically configuring a second eNB having a default TDD subframe configuration for a dormant mode of operation in accordance with one of the exemplary embodiments.
Figure 33:
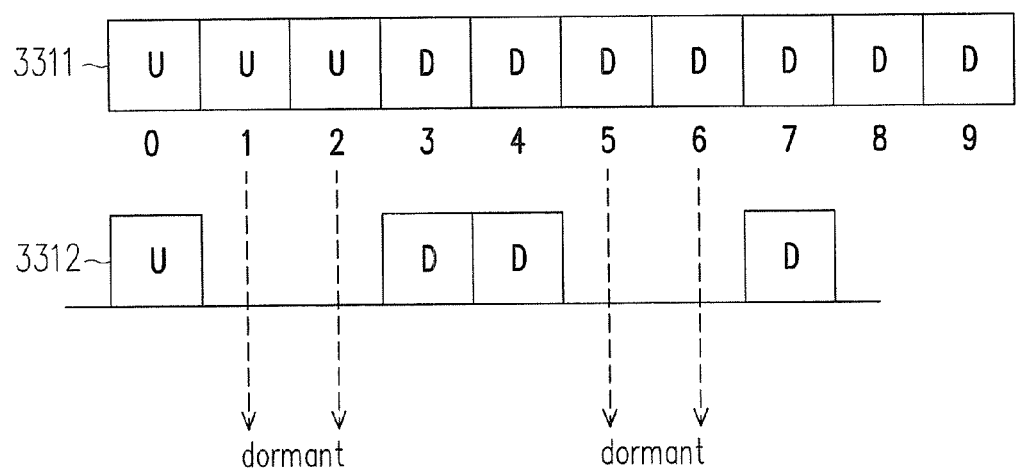
Figure 34:
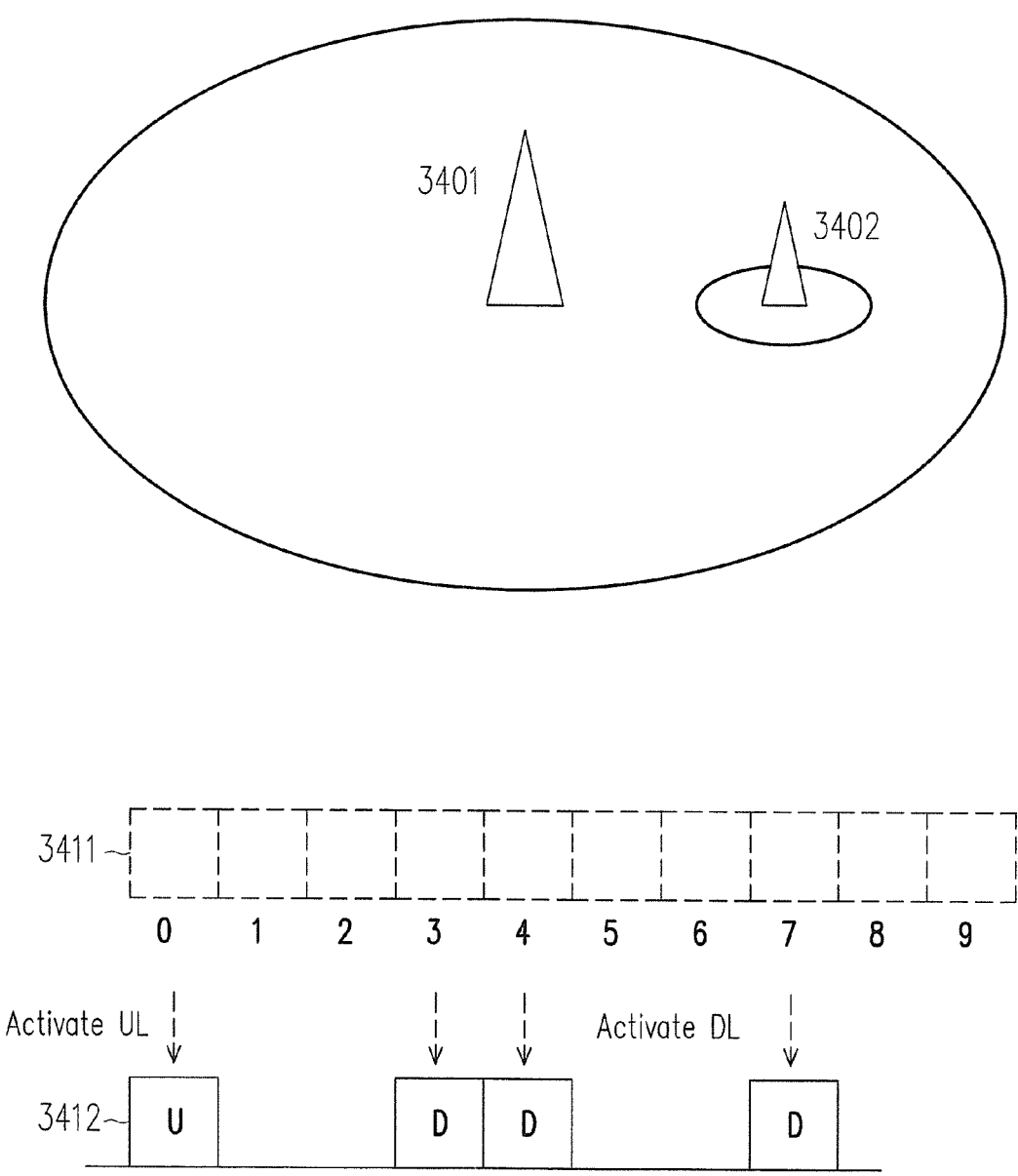
FIG. 34 illustrates dynamically configuring subframes of a second eNB having an empty TDD subframe configuration for transmission in accordance with one of the exemplary embodiments.

The embodiment of FIG. 34 is similar to the embodiment of FIG. 33 except that the SeNB 3402 has an empty subframe pattern 3411 by default. After collecting recent network traffic information from both the MeNB 3401 and the SeNB 3402, the MeNB 3401 has determined to configure a new subframe pattern 3412 for the SeNB 3402 by activating subframes 0, 3, 4, 7 of the empty subframe pattern 3411 by transmitting a signaling message to the SeNB 3402 in a similar manner as the embodiment of FIG. 33. Upon receiving the signaling message, the SeNB 3402 and one or more UEs served under the SeNB 3402 would then operate according to the new TDD subframe pattern 3412.

In an alternative embodiment similar to FIG. 34, the SeNB 3402 may determine to activate certain subframes from empty subframes on its own, or similarly, the SeNB 3402 may determine to activate certain subframes from empty subframes in response to receiving an instruction from a network controller (not shown).

Figure 35:
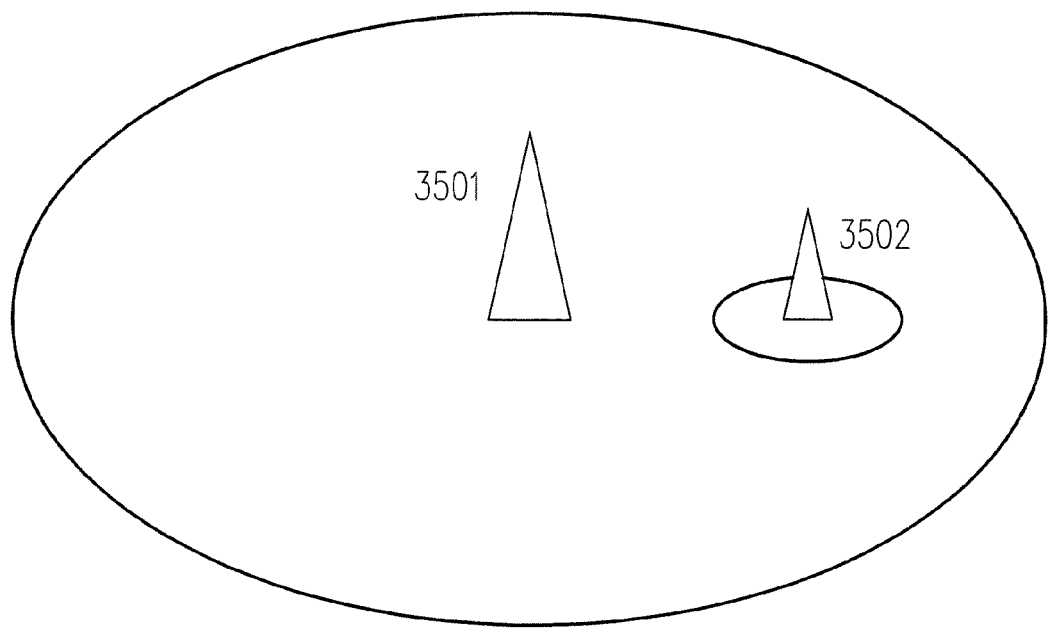
FIG. 35 illustrates dynamically configuring subframes of a second eNB having a predefined TDD subframe configuration for transmission in accordance with one of the exemplary embodiments.
Figure 35:
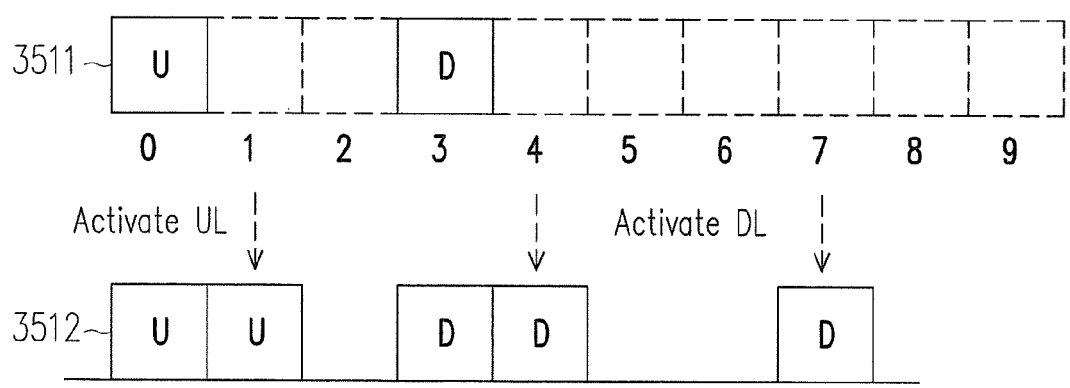

For the embodiment of FIG. 35, instead of activating subframes from a completely deactivated radio frame such as the scenario of FIG. 34, the default subframe configuration may contain subframes which have already been activated or may contain subframes which are anchoring subframes. Assuming that the SeNB 3502 has a default TDD subframe configuration pattern 3511 which contains two anchoring subframes at subframes 0 and 3 for example, the MeNB 3501 may dynamically configure and activate certain subframes. For example, the MeNB 3051 may determine to configure and subsequently activate subframes 1 as a uplink subframe and also subframes 4 and 7 as downlink subframes according to the current traffic demands. After the dynamic subframe configuration is complete, the SeNB 3502 would have a new TDD subframe pattern 3512 as shown in FIG. 35. The decision to dynamically configure the new TDD subframe pattern 3512 may also be initiated by the SeNB 3502 or by a network controller (not shown).

Figure 36:
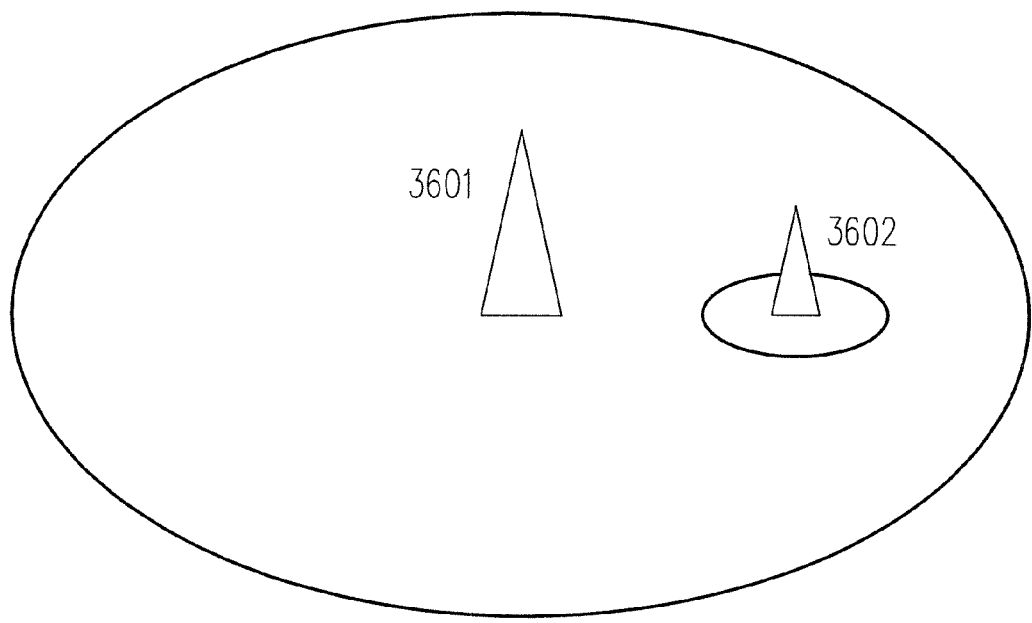
FIG. 36 illustrates using dynamic frame structure configuration mechanism to configure different secondary eNBs in accordance with one of the exemplary embodiments.

FIG. 36 illustrates using dynamic frame structure configuration mechanism to configure different secondary eNBs in accordance with one of the exemplary embodiments. Assuming that at time 1, the SeNB 3062 has a default TDD subframe pattern 3611 which could be, for example, TDD configuration 3 of FIG. 1. Based on the change of the uplink and downlink ratio, the default TDD subframe pattern 3611 at time 2 could be changed to a new TDD subframe pattern 3612 which could be, for example, TDD configuration 4 of FIG. 1. The time difference between time 1 and time 2 could be less than the modification period of the transmitting system information of the SeNB 3062. The change from the default TDD subframe pattern 3611 of the SeNB 3602 could be initiated by another base station such as a MeNB 3601 or by a network controller (not shown).

Figure 37:
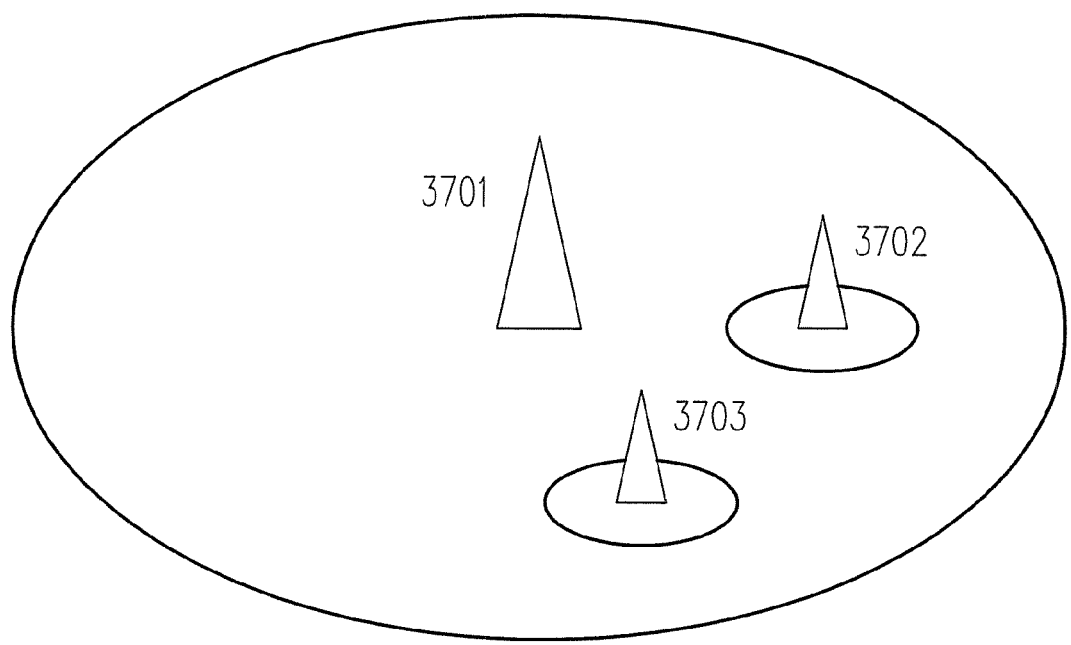
FIG. 37 illustrates coordinating dynamic resource allocation in multiple secondary eNBs in accordance with one of the exemplary embodiments.
Figure 37:
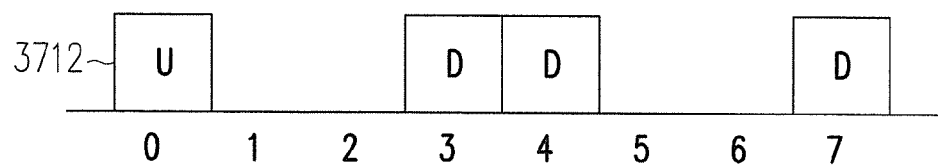
Figure 37:
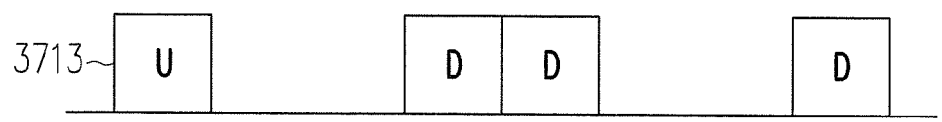

FIG. 37 illustrates coordinating dynamic resource allocation in multiple secondary eNBs in accordance with one of the exemplary embodiments. For the scenario of FIG. 37, both the subframe pattern 3712 of first SeNB 3702 and the subframe pattern 3713 of the second SeNB 3703 could be dynamically configured to be the same subframe patterns. The dynamic TDD subframe configuration of the SeNBs 3702 3703 could be initiated by a MeNB 3701 or by a network controller (not shown). Also for this scenario, a joint use of frequency division duplex (FDD) and TDD could be implemented. For example, FDD operation could be implemented by the Macro cell base station 3701, and TDD operation could be implemented by the SeNBs 3702 3703.

Figure 38:
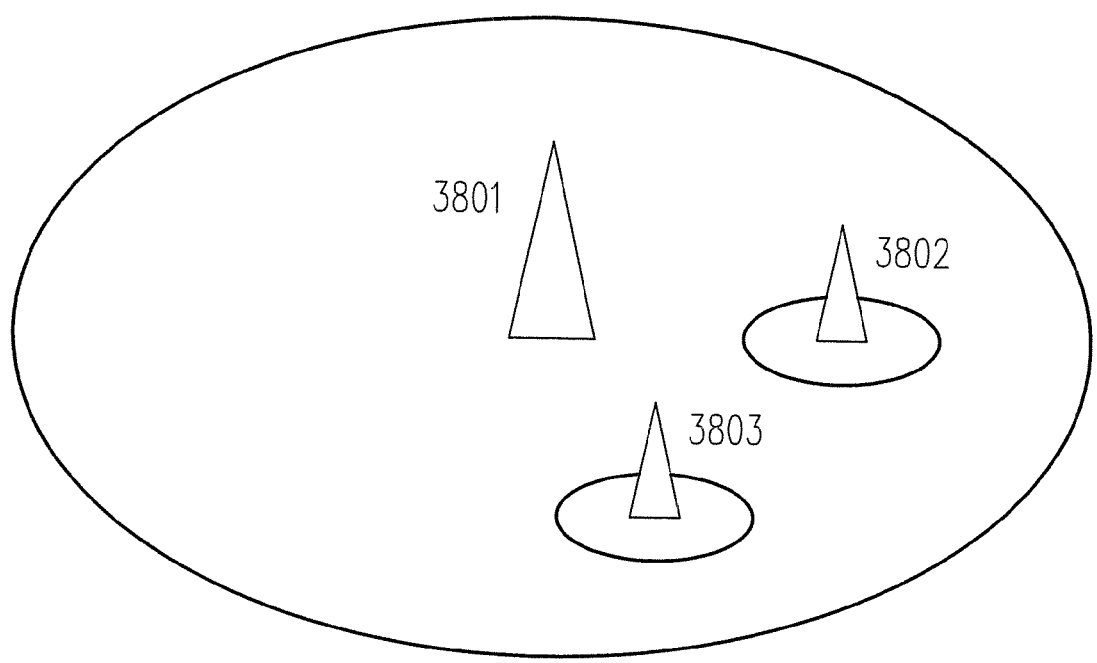
FIG. 38 illustrates coordinating dynamic resource allocation in multiple secondary eNBs in accordance with one of the exemplary embodiments.
Figure 38:
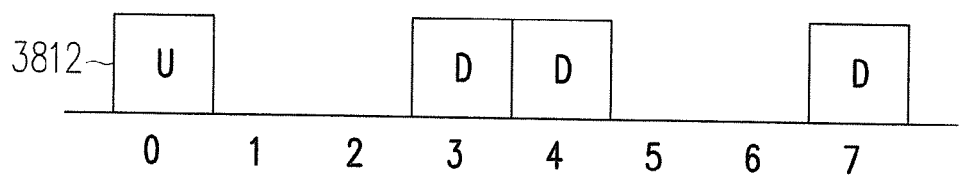
Figure 38:
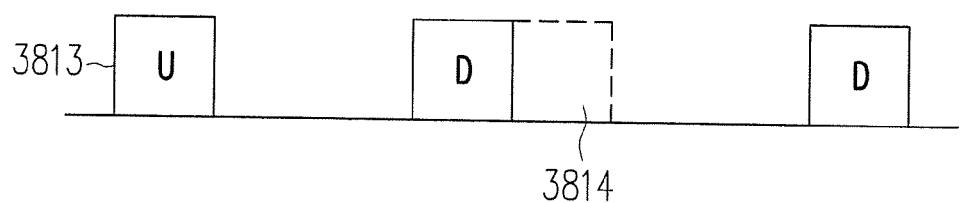

FIG. 38 illustrates coordinating dynamic resource allocation in multiple secondary eNBs in accordance with one of the exemplary embodiments. The embodiment of FIG. 38 is the same as the embodiment of FIG. 37 except that the active subframes of one cell could be a subset of the active subframes of another cell. For example, the active subframe pattern 3813 of the SeNB 3803 is the same as the active subframe pattern 3812 of the SeNB 3802 except for the subframe 3814. In general, the active subframe patterns of small cell base stations could be determined by a Macro cell base station such as the MeNB 3801 or by a network controller (not shown). By making the activated subframe pattern of one small cell base station a subset of the activated subframe pattern of another nearby small cell base station, interferences between small cells could be reduced.

In view of the aforementioned descriptions, the present disclosure is suitable for being used by a user equipment (UE) or by a base station and is able to dynamically activate or set dormant one or more subframes of a radio frame. In this way, the base station would have the flexibility to not only reduce power by keeping subframes dormant when the network traffic is lightly loaded but also to dynamically activating certain subframes for upload or download when the network traffic is heavy.

In this disclosure, 3GPP-like keywords or phrases are used merely as examples to present inventive concepts in accordance with the present disclosure; however, the same concept presented in the disclosure can be applied to any other systems such as IEEE 802.11, IEEE 802.16, WiMAX, and so like by persons of ordinarily skilled in the art. For exemplary purposes, a LTE communication system would be used as examples for the rest of the disclosure. Thus, the base station 102 under a LTE system would typically be an evolved Node B (eNB), and the network control node 103 would typically be a mobility management entity (MME). An eNB and a MME under a LTE system would typically be connected via a backhaul link such as a S1 interface.

The term "eNodeB" (eNB) in this disclosure may also be, for example, a base station (BS), a macro BS, a micro BS, a pico BS, a Node-B, an advanced base station (ABS), a base transceiver system (BTS), an access point, a home base station, a home eNB, a relay station, a scatterer, a repeater, an intermediate node, an intermediary, satellite-based communication base stations, and so forth.

Each eNB of a LTE communication system (i.e. each base station in other systems such as GSM) may contain at least but not limited to a transceiver circuit, an analog-to-digital (A/D)/digital-to-analog (D/A) converter, a processing circuit, a memory circuit, and one or more antenna units. The transceiver circuit transmits downlink signals and receives uplink signals wirelessly. The transceiver circuit may also perform operations such as low noise amplifying, impedance matching, frequency mixing, up or down frequency conversion, filtering, amplifying, and so like. The analog-to-digital (A/D)/digital-to-analog (D/A) converter is configured to convert from an analog signal format to a digital signal format during uplink signal processing and from a digital signal format to an analog signal format during downlink signal processing.

The processing circuit would be configured to process digital signal and to perform functions of the proposed base station in accordance with exemplary embodiments of the present disclosure. Also, the processing circuit would be coupled to a memory circuit which stores programming codes, codebook configurations, buffered data, or record configurations assigned by the processing circuit. The functions of the processing circuit may be implemented using programmable units such as a micro-processor, a micro-controller, a DSP chips, FPGA, etc. The functions of the processing circuit could be integrated under one electronic device or one integrated circuit (IC) but may also be implemented with separate electronic devices or ICs.

The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a mobile environment, such as a bus, a train, an airplane, a boat, a car, and so forth.

Each UE of the communication system may contain at least but not limited to a transceiver circuit, an analog-to-digital (A/D)/digital-to-analog (D/A) converter, a processing circuit, a memory circuit, and one or more antenna units. The memory circuit may store programming codes, buffer data, and a configured codebook. The processing circuit may further include a precoding unit. The function of each element of a UE is similar to an eNB and therefore detailed descriptions for each element will not be repeated.

It should be noted that the adjective "first" or "second" or "third" or "fourth" is simply used to distinguish one item or object from another and thus may or may not imply a sequence of events.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

In all the drawings of the present disclosure, a box enclosed by dotted lines would mean an optional functional element or an optional step, and a dotted line may mean that the process flow could be optional or may not necessarily occur.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A user equipment (UE) comprising a transmitter and a receiver for transmitting and receiving wireless data respectively and a processing circuit coupled to the transmitter and the receiver and is configured for:

receiving through the receiver a first configuration message comprising an uplink configuration for a first subframe of a first radio frame and a downlink configuration for a second subframe of the first radio frame, wherein the first subframe and the second subframe of the first radio frame are both without any uplink configuration and without any downlink configuration before receiving the first configuration message;

configuring the first subframe of the first radio frame with the uplink configuration in response to receiving through the receiver the first configuration message and configuring the second subframe of the first radio frame with the downlink configuration in response to receiving through the receiver the first configuration message while leaving the other subframes empty;

transmitting through the transmitter an uplink data in the first subframe of the first radio frame, and receiving through the receiver an downlink data in the second subframe of the first radio frame after configuring the first radio frame; and receiving through the receiver a second configuration message to set dormant the first subframe of the first radio frame or the second subframe of the first radio frame, wherein the second configuration message is determined based on a instantaneous traffic information, wherein in response to the processing circuit configuring the first subframe of the first radio frame for uplink and configuring the second subframe of the first radio frame for downlink, the first subframe and the second subframe are dormant after a specific period.

2. The UE of claim 1, wherein before the receiver receives the first configuration message, the first radio frame further comprises a third subframe which has been configured for either uplink or downlink.

3. The UE of claim 2, wherein the processing circuit is configured for transmitting through the transmitter the first radio frame further comprising:

A fourth subframe in the first radio frame which has not been activated for downlink or uplink.

4. The UE of claim 1, wherein the processing circuit is further configured for transmitting through the transmitter a second radio frame in which all subframes have the same uplink configuration or downlink configuration as the first radio frame.

5. The UE of claim 1, wherein the processing circuit is further configured for receiving through the receiver the first configuration message by decoding a physical downlink control channel (PDCCH).

6. The UE of claim 5, wherein the processing circuit is further configured for decoding from the PDCCH a new Radio Network Temporary Identifier (RNTI) from which the UE decodes the first configuration message.

7. The UE of claim 1, wherein the processing circuit is configured for receiving through the receiver a system information block (SIB) from which the first configuration message is obtained by the UE.

8. A base station comprising a transmitter and a receiver for transmitting and receiving wireless data respectively and a processing circuit coupled to the transmitter and the receiver and is configured for:

configuring a first subframe of a first radio frame with an uplink configuration and configuring a second subframe of the first radio frame with an downlink configuration, wherein the first subframe and the second subframe of the first radio frame are both without any uplink configuration and without any downlink configuration before configuring the first radio frame;

transmitting through the transmitter a first configuration message comprising the uplink configuration for the first subframe of the first radio frame and the downlink configuration for the second subframe of the first radio frame;

receiving through the receiver an uplink data in the first subframe of the first radio frame and transmitting through the transmitter a downlink data in the second subframe of the first radio frame after transmitting the first configuration message; and transmitting through the transmitter a second configuration message to set dormant the first subframe of the first radio frame or the second subframe of the first radio frame, wherein the second configuration message is determined based on a instantaneous traffic information, wherein in response to the processing circuit configuring the first subframe of the first radio frame for uplink and configuring the second subframe of the first radio frame for downlink, the first subframe and the second subframe are dormant after a specific period.

9. The base station of claim 8, wherein before the transmitter transmits the first configuration message, the first radio frame further comprises a third subframe which has been configured for either uplink or downlink.

10. The base station of claim 8, wherein the processing circuit is configured for transmitting through the transmitter the first radio frame further comprising:
A fourth subframe in the first radio frame which has not been activated for downlink or uplink.

11. The base station of claim 8, wherein the processing circuit is further configured for transmitting through the transmitter a second radio frame in which all subframes have the same uplink configuration or downlink configuration as the first radio frame.

12. The base station of claim 8, wherein the processing circuit is further configured for transmitting through the transmitter the first configuration message encoded a physical downlink control channel (PDCCH).

13. The base station of claim 12, wherein the processing circuit is further configured for encoding the first configuration message using a new Radio Network Temporary Identifier (RNTI) which is encoded within the PDCCH.

14. The base station of claim 8, wherein the processing circuit is configured for transmitting through the transmitter a system information block (SIB) from which the first configuration message is broadcasted by the base station.

* * * * *